(12) United States Patent
Akcay et al.

(10) Patent No.: US 12,502,509 B2
(45) Date of Patent: Dec. 23, 2025

(54) RELEASABLE SAFETY CATHETER INSERTION ASSEMBLY

(71) Applicant: Smiths Medical ASD, Inc., Plymouth, MN (US)

(72) Inventors: Gursel Akcay, Killingworth, CT (US); Jay T. Breindel, Branford, CT (US); Harsh D. Chheda, Cheshire, CT (US); Kathryn Felicito, Cheshire, CT (US); David J. Goral, Brookfield, CT (US); Thomas T. Koehler, Simsbury, CT (US); Christopher Roehl, New Hartford, CT (US)

(73) Assignee: ICU MEDICAL, INC.

( * ) Notice: Subject to any disclaimer, the term of this patent is extended or adjusted under 35 U.S.C. 154(b) by 784 days.

(21) Appl. No.: 15/733,439

(22) PCT Filed: Jan. 31, 2019

(86) PCT No.: PCT/US2019/016017
§ 371 (c)(1),
(2) Date: Jul. 30, 2020

(87) PCT Pub. No.: WO2019/152630
PCT Pub. Date: Aug. 8, 2019

(65) Prior Publication Data
US 2021/0100985 A1    Apr. 8, 2021

Related U.S. Application Data

(60) Provisional application No. 62/643,229, filed on Mar. 15, 2018, provisional application No. 62/624,470, filed on Jan. 31, 2018.

(51) Int. Cl.
*A61M 25/06*    (2006.01)
*A61M 5/158*    (2006.01)
(Continued)

(52) U.S. Cl.
CPC .... *A61M 25/0618* (2013.01); *A61M 25/0097* (2013.01); *A61M 25/0606* (2013.01); *A61M 39/22* (2013.01)

(58) Field of Classification Search
CPC .......... A61M 25/0618; A61M 25/0097; A61M 25/0606; A61M 39/22; A61M 25/0631; A61M 25/0625; A61M 2039/064
See application file for complete search history.

(56) References Cited

U.S. PATENT DOCUMENTS

2007/0083167 A1    4/2007 Smith et al.
2007/0112305 A1    5/2007 Brimhall
(Continued)

FOREIGN PATENT DOCUMENTS

CN    104043186 A    9/2014
WO    2011162866 A1    12/2011
(Continued)

OTHER PUBLICATIONS

International Search Report and Written Opinion for International Application No. PCT/US2019/016017 mailed Apr. 29, 2019.
(Continued)

*Primary Examiner* — Kevin C Sirmons
*Assistant Examiner* — Hamza A Darb
(74) *Attorney, Agent, or Firm* — Louis Woo

(57) ABSTRACT

A safety catheter insertion assembly configured to inhibit access to the distal tip of a needle cannula prior to release of a catheter insertion assembly from a catheter hub. The safety catheter insertion assembly including a catheter assembly having an elastomeric blood control valve and a catheter insertion device having a safety clip, the safety clip movable between an expanded configuration in which a portion of the safety clip applies a compressive force to a portion of the elastomeric blood control valve, and a collapsed configura-
(Continued)

tion in which the compressive force is reduced and release of the safety clip from the elastomeric blood control valve is enabled.

20 Claims, 26 Drawing Sheets

(51) Int. Cl.
  *A61M 25/00* (2006.01)
  *A61M 39/22* (2006.01)

(56) References Cited

U.S. PATENT DOCUMENTS

| | | |
|---|---|---|
| 2011/0319825 A1 | 12/2011 | Goral |
| 2011/0319838 A1* | 12/2011 | Goral ............... A61M 25/0015 604/272 |
| 2014/0276453 A1* | 9/2014 | Woehr ............. A61M 25/0606 604/246 |
| 2015/0151085 A1 | 6/2015 | Tan et al. |
| 2015/0335858 A1 | 11/2015 | Woehr et al. |
| 2016/0158526 A1* | 6/2016 | Woehr ................. A61M 39/22 604/122 |
| 2017/0119977 A1 | 5/2017 | Teoh |
| 2018/0214673 A1* | 8/2018 | Ng .................... A61M 39/0693 |

FOREIGN PATENT DOCUMENTS

| | | | |
|---|---|---|---|
| WO | 2013027355 A1 | 2/2013 | |
| WO | 20140140263 A1 | 9/2014 | |
| WO | 2015161296 A1 | 10/2015 | |
| WO | 2017029361 A1 | 2/2017 | |
| WO | WO-2017029374 A1 * | 2/2017 | ........ A61M 25/0606 |
| WO | 20170151052 A1 | 9/2017 | |

OTHER PUBLICATIONS

Chinese First Office Action dated Jan. 26, 2022 for CN application No. 201980023690.3.
Indian First office action dated May 20, 2022 for Indian application No. 202047035121.

* cited by examiner

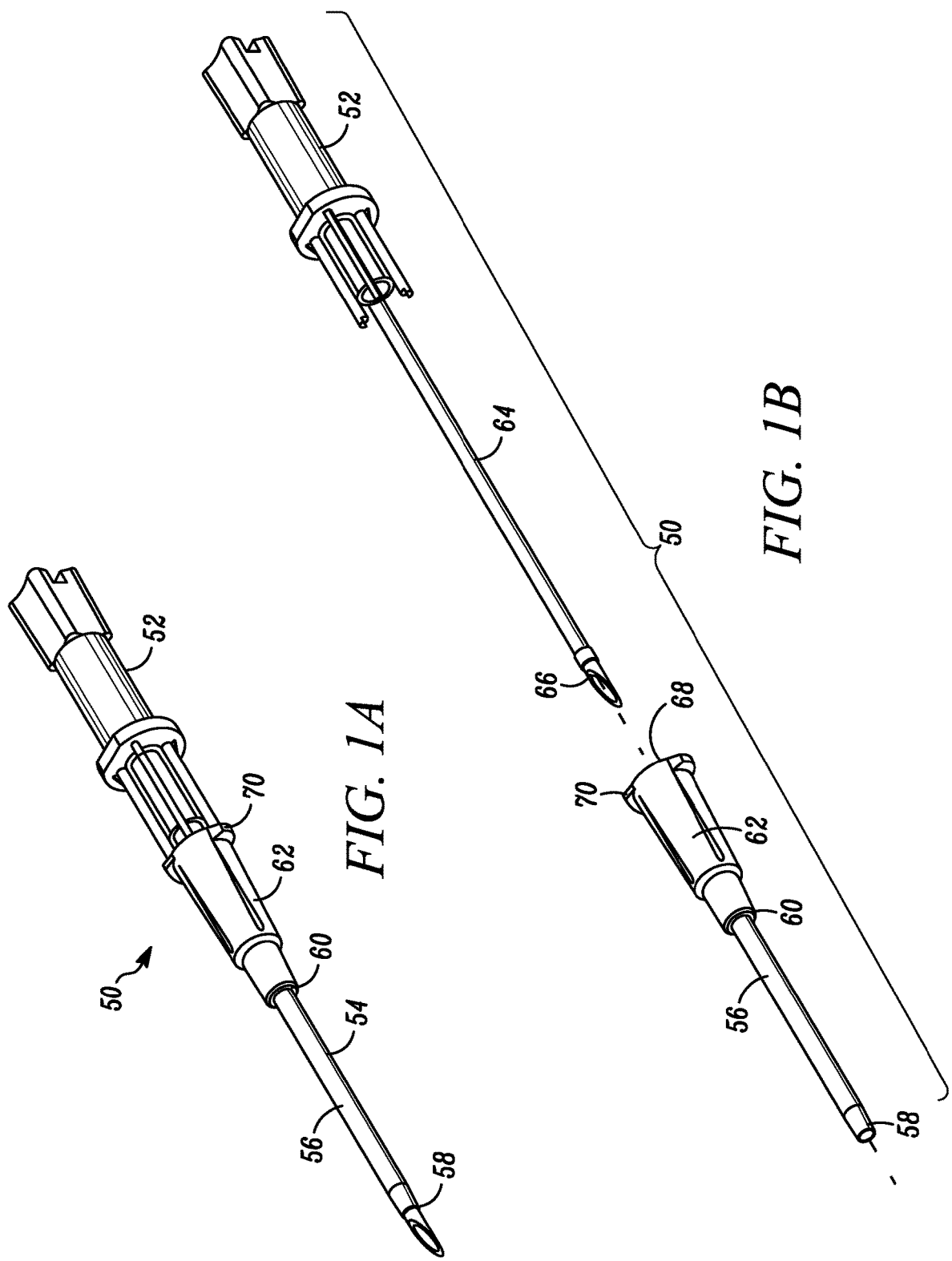

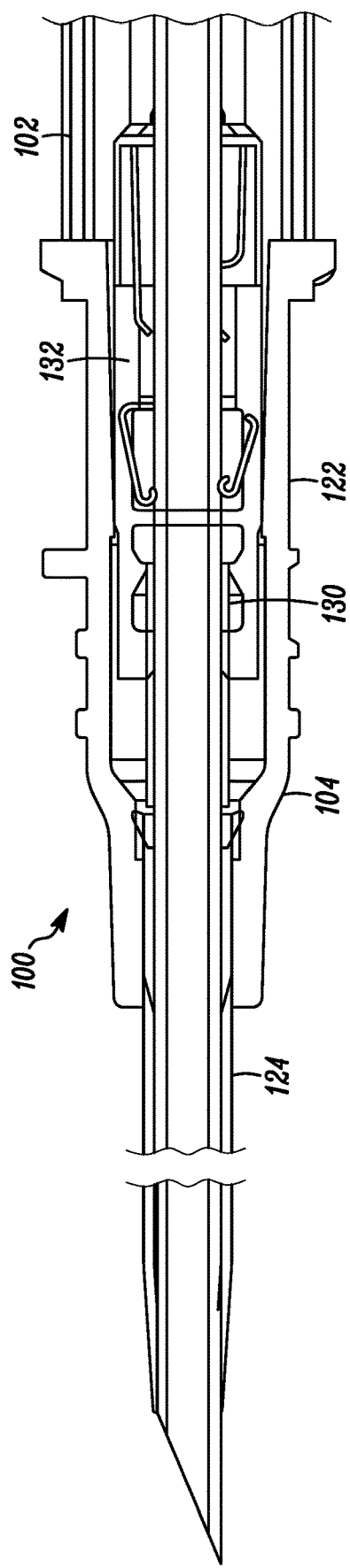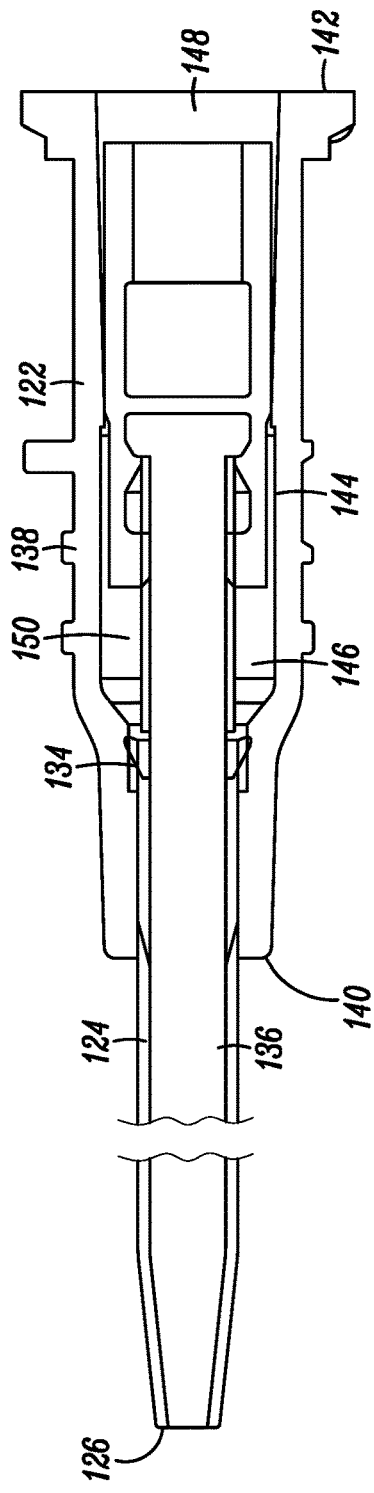
FIG. 4A
FIG. 4B

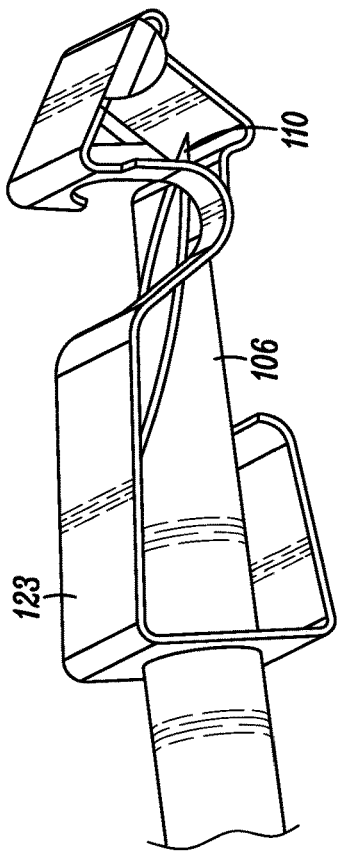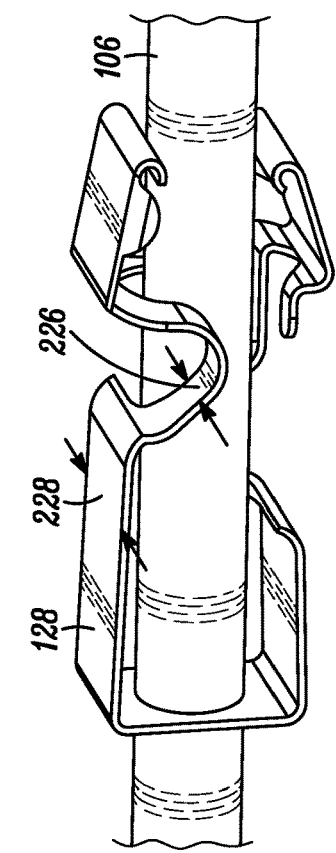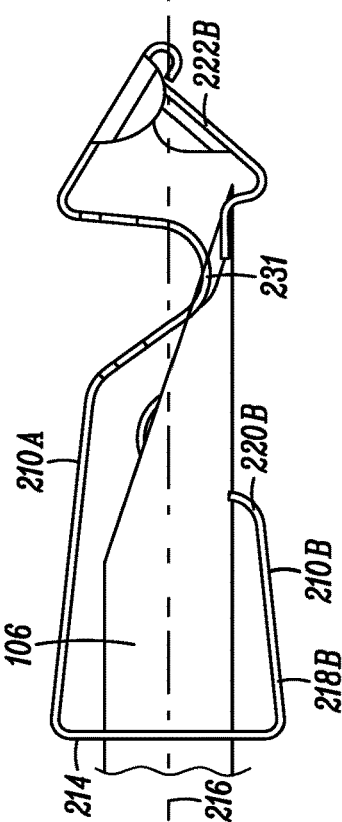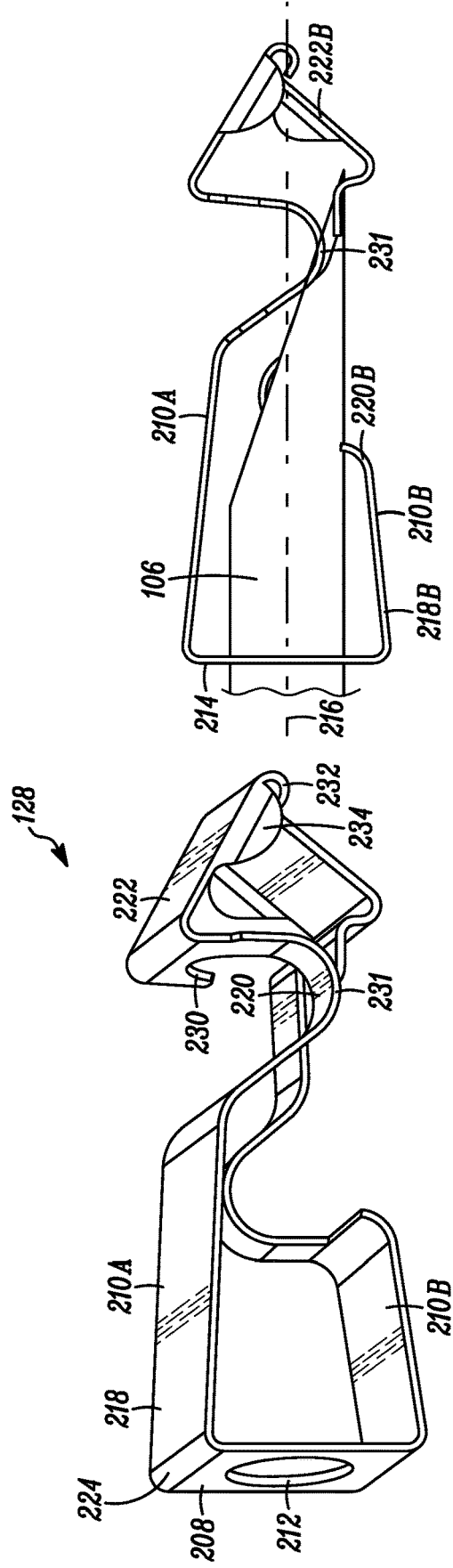
FIG. 9B
FIG. 9D
FIG. 9A
FIG. 9C

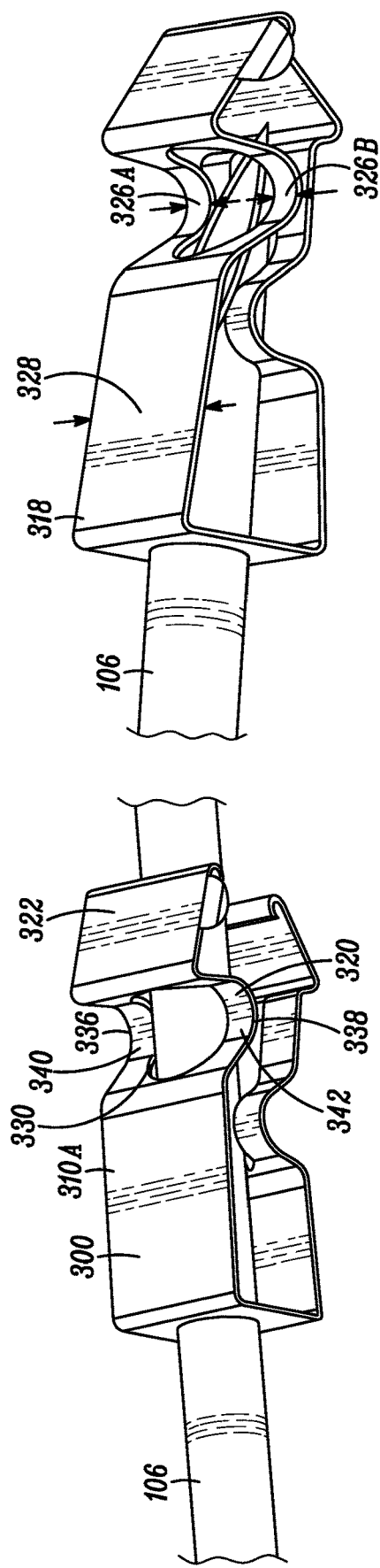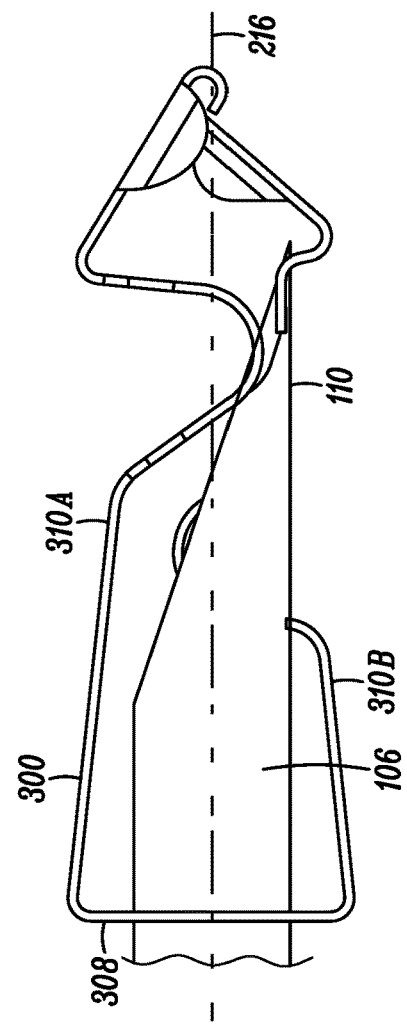
FIG. 10B
FIG. 10C
FIG. 10A

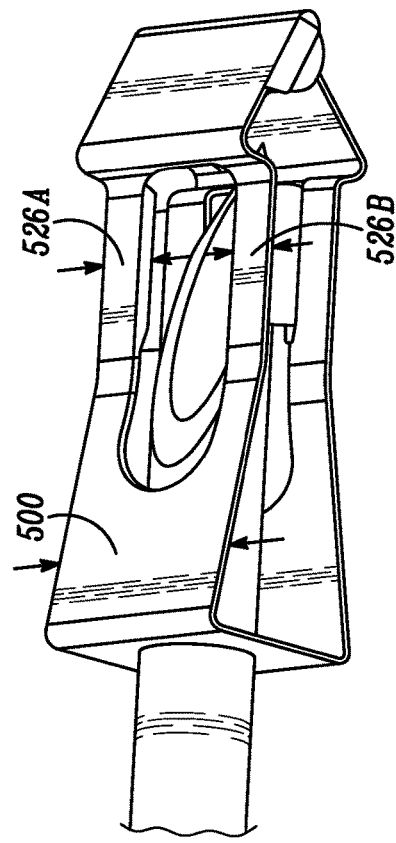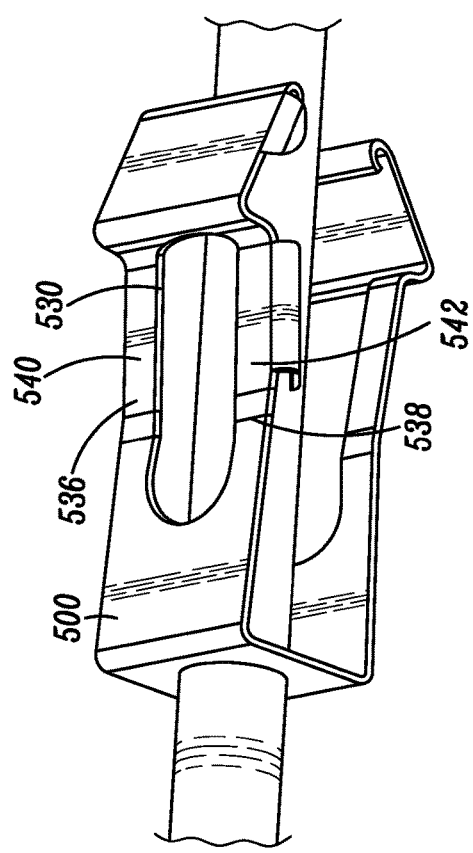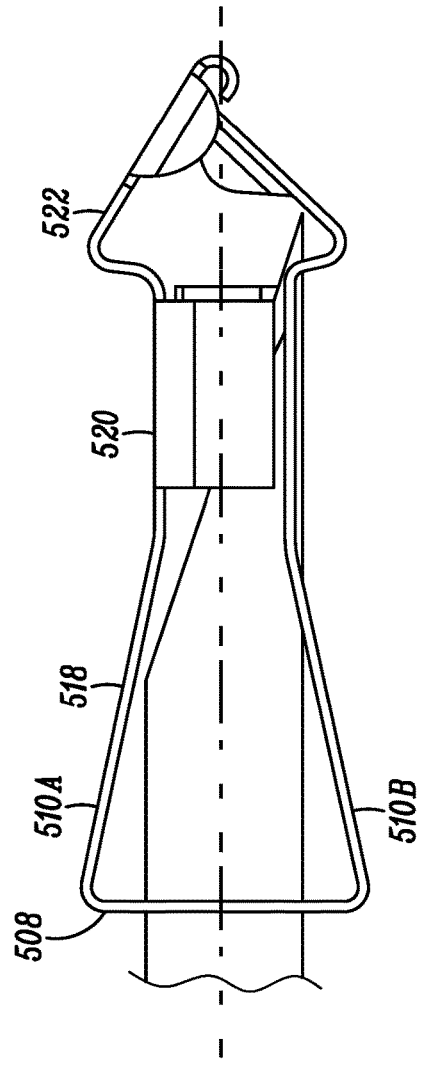
FIG. 12B
FIG. 12A
FIG. 12C

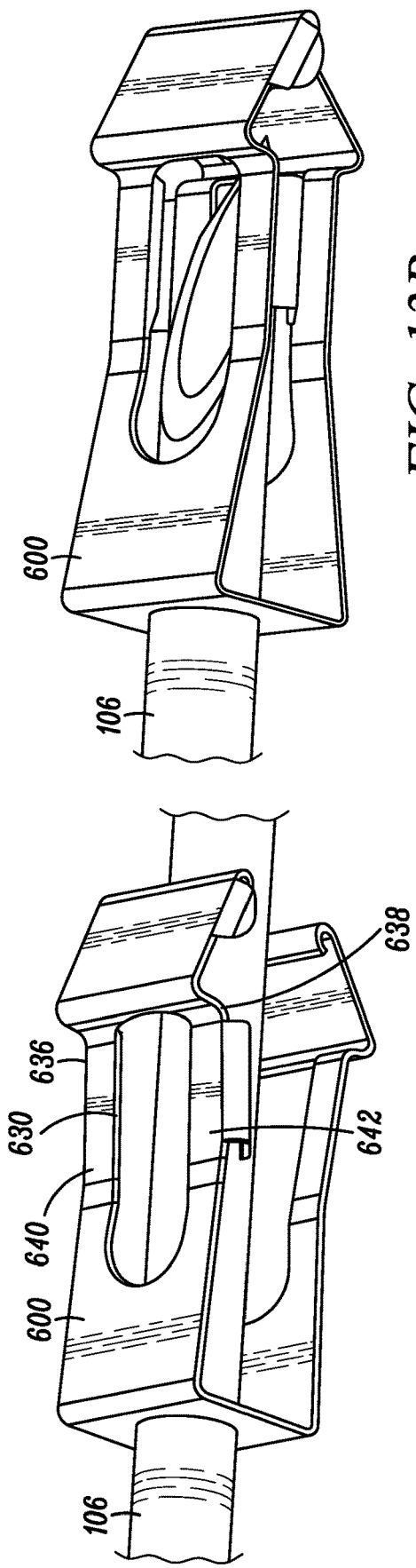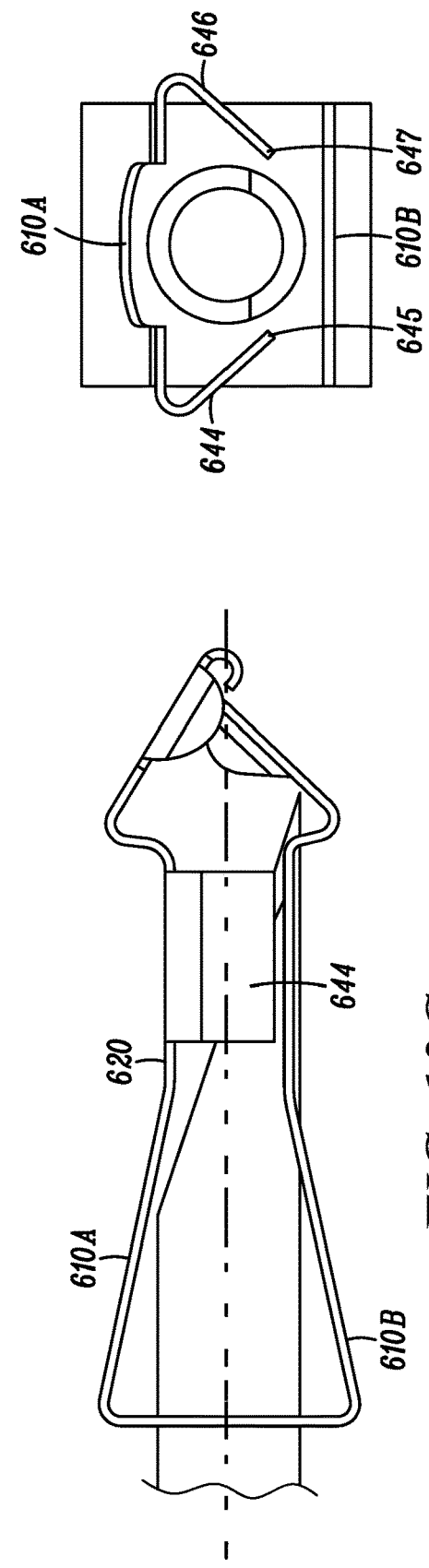
*FIG. 13B*
*FIG. 13D*
*FIG. 13A*
*FIG. 13C*

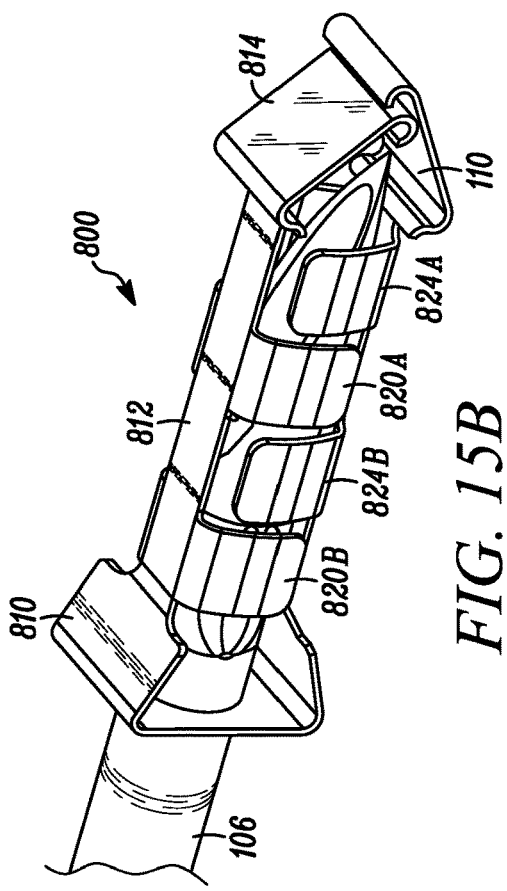
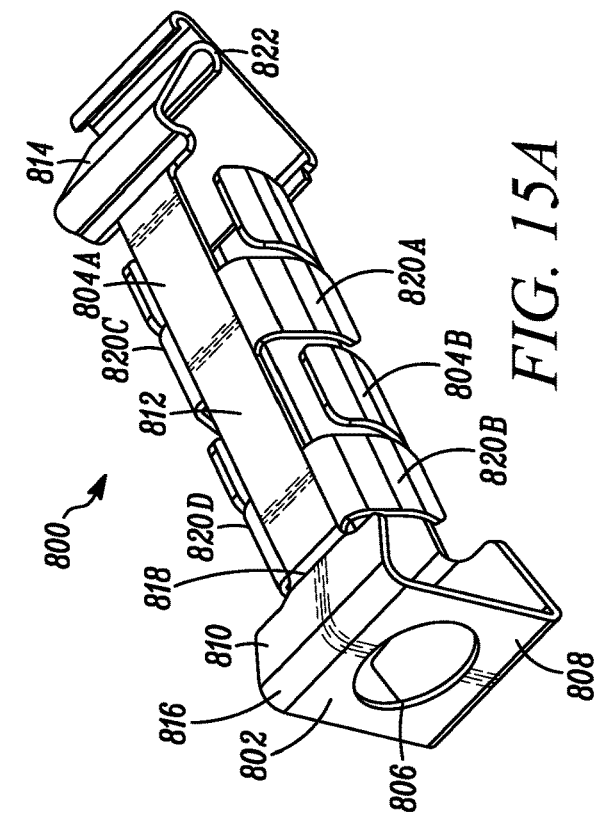
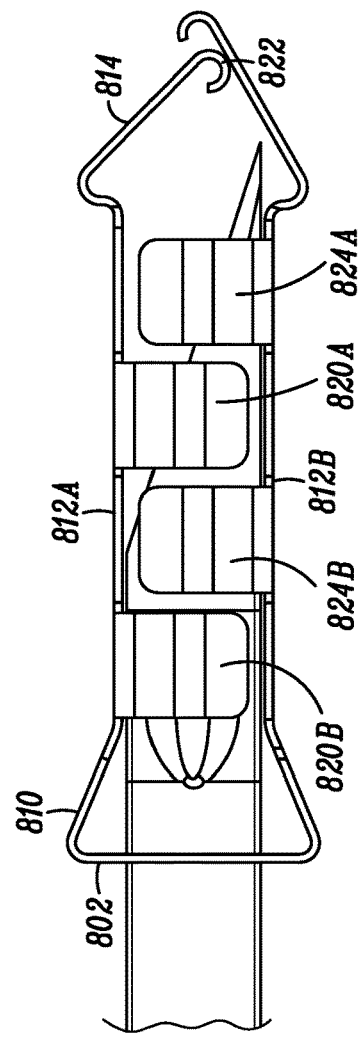
FIG. 15A
FIG. 15B
FIG. 15C

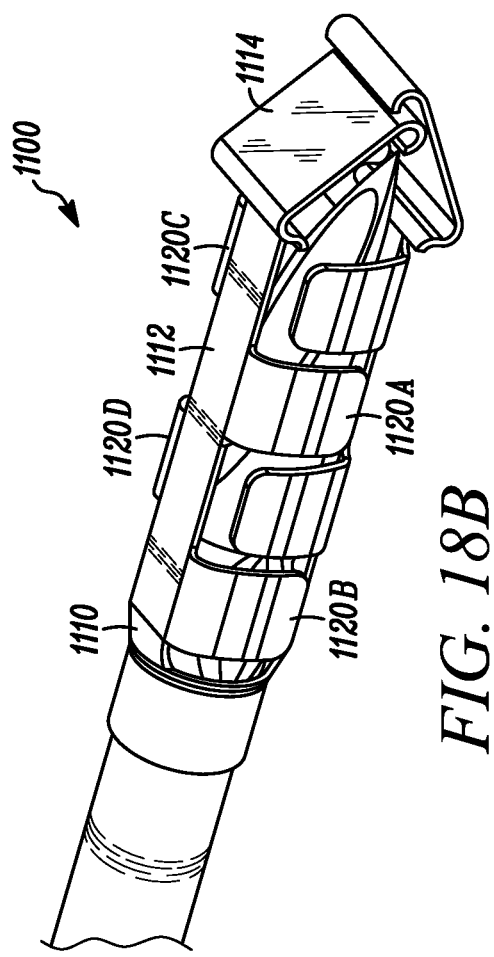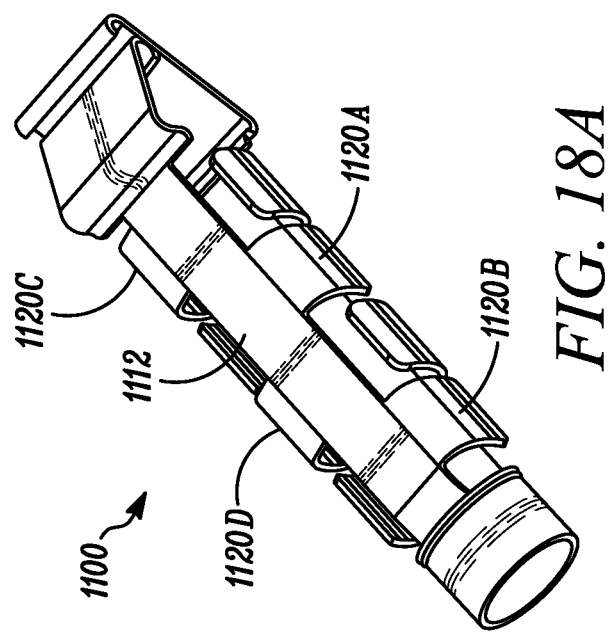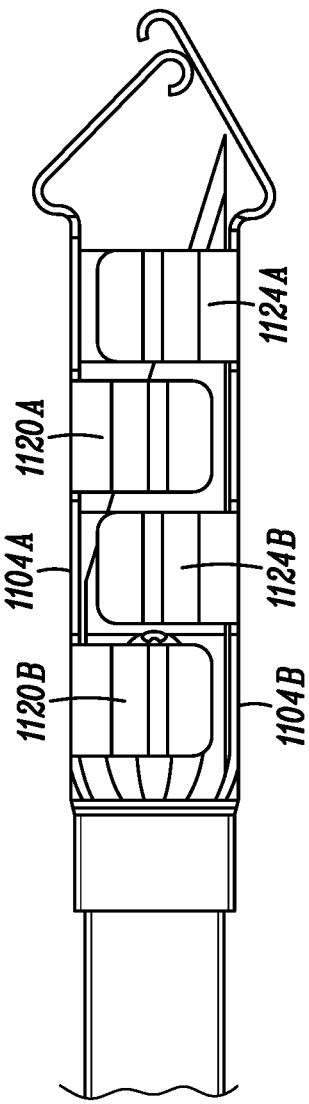

RELEASABLE SAFETY CATHETER INSERTION ASSEMBLY

RELATED APPLICATION INFORMATION

This application claims the benefit of U.S. Provisional Application No. 62/624,470 (filed Jan. 31, 2018) and U.S. Provisional Application No. 62/643,229 (filed Mar. 15, 2018), the contents of which are fully incorporated herein by reference.

TECHNICAL FIELD

The present disclosure relates generally to safety catheters, and more particularly to a safety catheter having a passive release mechanism configured to shield a sharp distal tip of a needle cannula prior to release of a catheter hub from a catheter insertion device.

BACKGROUND

Intravenous (IV) therapy is a versatile technique used for the administration of medical fluids to and withdrawal of bodily fluids from patients. IV therapy has been used for various purposes, such as the maintenance of blood and electrolyte balance, the transfusion of blood, the administration of nutritional supplements, chemotherapy, and the administration of drugs and medications. These fluids, collectively referred to herein as medicaments, may be administered intravenously by injection through a hypodermic needle, or intermittently or continuously by infusion using a needle or catheter. A common intravenous access device utilized by clinicians is the Peripheral Intravenous Catheter (PIVC).

A PIVC is made of a soft, flexible plastic or silicone, generally between fourteen to twenty-four gauge in size. In the conventional venipuncture procedure, a catheter is inserted into a vein in the patient's hand, foot, or the inner aspect of the arm or any vein in the body that will accept an IV catheter. In order to place the IV catheter into the patient's vein, a sharp introducer needle is used to puncture the skin, tissue, and vein wall to provide a path for placement of the catheter into the vein.

Referring to FIGS. 1A-B, a conventional catheter insertion assembly 50 including a catheter insertion device 52 configured to insert an "over the needle" catheter 54 is depicted. Catheter 54 generally includes a catheter tube 56 having a distal end 58 for insertion into a biological site, a proximal end 60 and a flexible wall defining a lumen extending therebetween. Frequently, the proximal end 60 of the catheter tube 56 is operably coupled to a catheter hub 62. Catheter 54 can be operably coupleable to the catheter insertion device 52, in part by positioning the catheter 54 coaxially over a needle cannula 64 of the catheter insertion device 52. The catheter 54 thus rides with the needle cannula 64 through the skin, tissue and vein wall into the patient's vein.

Various catheter insertion devices have been developed to provide a needle for catheterization. One such example of this type of catheter insertion device is marketed by Smiths Medical ASD, Inc. of St. Paul, Minn., under the JELCO and INTUITIV trademarks, and are described in U.S. Pat. No. 8,257,322 and U.S. Pat. Publ. Nos. 2011/0319838; and 2017/0095617, the contents of which are incorporated by reference herein. In other cases, the catheter insertion device provides a safety needle assembly that functions to house the sharpened tip of the needle to reduce the likelihood of an inadvertent needle stick. Examples of this type of catheter insertion device are marketed by Smiths Medical ASD, Inc. under the PROTECTIV and VIAVALVE trademarks, and are described in U.S. Pat. Nos. 5,000,740; 7,736,342 and U.S. Pat. Publ. No. 2016/0220791, the contents of which are incorporated by reference herein.

Once the catheter tube 56 has been entered into the patient's vein, the needle cannula 64 and catheter 54 are lowered towards the skin of the patient to decrease the entry angle, and the catheter tube 56 is advanced slightly into the vein. The connection between the catheter 54 and the needle cannula 64 is then loosened, so that the catheter tube 56 can be advanced further into the vein as desired, and the needle cannula 64 can be withdrawn from the catheter 54.

In some cases, the catheter 54 can include a tip protector through which at least a portion of the needle cannula 64 passes. The tip protector can be configured to enclose or otherwise shield a sharp distal tip 66 of the needle cannula 64 after it has been withdrawn from the catheter tube 56. One form of tip protector involves a clip that fits within the catheter hub 62. Such clips can include thin webs of metal or the like which are bent or otherwise formed to have a back wall and one or more distally extending walls, all generally of the same thickness. In a ready state of the clip, the shaft of the needle cannula 64 passes through an aperture in the back wall of the clip and against a pair of distally extending arms, to pass into the catheter tube 56. The needle cannula 62 can be pulled proximally relative to the clip, so as to bring the distal tip 66 within the clip proximal to the back wall, whereupon the arms are configured to close to block distal reemergence of the distal tip 66. Further proximal movement of the needle cannula 64 pulls the tip protector out of the catheter hub 62.

The catheter hub 62 can be coupled to an administration set or syringe for introducing fluids into, and/or withdrawing bodily fluid from, the patient. The catheter hub 62 can have an open proximal end 68 adapted to receive a male luer taper into a cavity defined therein to establish a fluid connection between the patient's vasculature and a luer taper. The proximal end 68 can also be provided with external ears 70, or the like, to secure the luer taper in the catheter hub 62, such as when the luer taper is coupled with a male luer lock collar of an administration set or syringe.

Under normal conditions, after withdrawal of the needle cannula 64 and before a luer taper is inserted into the catheter hub 62, blood flows through the catheter tube 54 and into the interior cavity of the catheter hub 62. To limit blood flow, the catheter hub 62 can include a valve or septum that seals the needle cannula path after the needle cannula 64 has been withdrawn from the catheter 54, thereby inhibiting blood or bodily fluid from the patient from escaping from the catheter 54 to the surrounding environment.

Catheter insertion devices 50 which attempt to lock the catheter 54 to the catheter insertion device 52 during insertion have been created. However, such devices could be improved to consistently enable a smooth release of the catheter hub 62 from the needle cannula 64, particularly in a way that reduces or eliminates the risk of an inadvertent needle stick. Accordingly, Applicants of the present disclosure have identified a need for a safety catheter insertion assembly that includes a mechanism for smoothly and passively releasing the catheter from the catheter insertion device upon retraction of the needle cannula.

SUMMARY OF THE DISCLOSURE

Embodiments of the present disclosure provide a safety catheter insertion assembly that includes a mechanism for smoothly and passively releasing a catheter from a catheter insertion device upon withdrawal of a needle cannula into a tip protector, thereby inhibiting the risk of an inadvertent needle stick, while improving the catheter insertion process.

One embodiment of the present disclosure provides a safety catheter insertion assembly including a catheter assembly, catheter insertion device, and passive release mechanism. The catheter assembly includes a catheter hub and a catheter tube extending distally thereof. The catheter hub can have an open proximal end and a distal end defining an interior cavity therebetween. The catheter insertion device can include a needle hub and a needle cannula extending distally from the needle hub. The needle cannula can have a sharp distal tip. The passive release mechanism can be configured to couple the catheter hub to the catheter insertion device, and can include a compliant seal member and a safety clip. The compliant seal member can be disposed in the interior cavity of the catheter hub, and can have an open distal and a proximal end defining an interior cavity therebetween. The safety clip can be releasably coupled to the compliant seal member, and can be configured to move relative to the needle cannula between a first position where the distal tip extends distally from the safety clip, and a second position where the distal tip is captured within the safety clip. In the first position, a portion of the safety clip applies a compressive force to a portion of the compliant seal member. In the second position, the compressive forces reduced and release of the safety clip from the compliant seal member is enabled, such that access to the distal tip of the needle cannula is inhibited prior to release of the needle clip from the compliant seal member.

In one embodiment, when the safety clip is in the second position, the needle insertion assembly is removable from the catheter hub without substantial interference. In one embodiment, the compliant seal member is a blood control valve. In one embodiment, the safety catheter insertion assembly further includes a rigid actuator extending proximally in the interior cavity of the catheter hub, a free proximal end of the rigid actuator including an enlarged proximal flange. In one embodiment, the compliant seal member can include an actuator cavity configured to house the enlarged proximal flange of the rigid actuator, and a membrane defining a valve slit proximal to the actuator cavity, wherein the proximal flange of the rigid actuator is shiftable relative to the compliant seal member between a first position in which the valve slit is closed, and a second position in which the valve slit is open. In one embodiment, the safety catheter insertion assembly further includes a proximal cup operably coupled to the compliant seal member, the proximal cup having an open distal end and a proximal end defining a cavity therebetween, the cavity defined by the compliant seal member adjoining with the cavity defined by the proximal cup to form a cavity configured to house the safety clip. In one embodiment, the proximal cup further includes a stem extension configured to conform to an outer diameter of the needle cannula, so as to inhibit the passage of bodily fluid from within the cavity of the proximal cup. In one embodiment, the compliant seal member includes a blood control valve configured to enable the needle cannula to selectively pass therethrough, and a wiper assembly positioned distal to the blood control valve and configured to inhibit the passage of bodily fluid therethrough. In one embodiment, the safety clip includes a first arm and a second arm biased towards the longitudinal axis of the needle cannula one positioned therebetween. In one embodiment, the first arm includes a first needle cannula guide surface and a second arm includes a second needle cannula guide surface, such that when the safety clip is in the second position the first and second needle cannula guide surfaces extend beyond the longitudinal axis of the needle cannula. In one embodiment, the first arm includes a pair of needle cannula guide surfaces that extend beyond the longitudinal axis of the needle cannula when the safety clip is moved to the second position.

Another embodiment of the present disclosure provides a passive safety catheter assembly. The passive safety catheter assembly can include a catheter assembly, catheter insertion device, and passive release mechanism. The catheter assembly can include a catheter hub and a catheter tube extending distally thereof. The catheter insertion device can include a needle hub and a needle cannula extending distally thereof. The needle cannula can include a sharp distal tip. The passive release mechanism can include a compliant outer seal member received within the catheter hub, and an inner needle clip member being at least partially received within the compliant outer seal member. The needle cannula can be slidably received within the inner clip member, and movable between a first position in which the needle cannula forces a portion of the inner needle clip member into compressive contact with the compliant outer seal member, and a second position in which the distal tip is captured within the inner needle clip member and the compressive contact is reduced, such that the insertion needle assembly is removable from the catheter hub without substantial interference.

In one embodiment, the inner needle clip member is configured to capture the distal tip of the needle cannula prior to release of the needle clip from the compliant outer seal member. In one embodiment, the compliant outer seal member is shiftable between a first position in which a blood control valve of the compliant outer seal member is closed, and a second position in which the blood control valve is opened. In one embodiment, the passive safety catheter assembly further includes a proximal cup operably coupled to the compliant outer seal member, the proximal cup having an open distal end and a proximal end defining a cavity therebetween, the cavity defined by the compliant outer seal member adjoining with the cavity defined by the proximal cup to form a cavity configured to house the inner needle clip member. In one embodiment, the compliant outer seal member can include a membrane defining a blood control valve configured to enable a needle cannula to selectively pass therethrough, and a wiper assembly positioned distal to the blood control valve configured to inhibit passage of the bodily fluid therethrough.

Another embodiment of the present disclosure provides a catheter hub assembly. The catheter hub assembly can include a catheter hub body, rigid actuator, compliant seal member, and safety clip. The catheter hub body can have an open proximal end and a distal end defining an interior cavity therebetween. The rigid actuator can extend proximally in the interior cavity of the catheter hub from the catheter hub distal end to a free end. The actuator can have an enlarged proximal flange at the free end thereof. The compliant seal member can be disposed in the interior cavity of the catheter hub. The compliant seal member can include an actuator cavity configured to house the enlarged proximal flange of the rigid actuator, and a membrane defining a valve aperture position proximal to the actuator cavity, wherein the proximal flange of the rigid actuator is shiftable relative to the compliant seal member between a first position in which the valve aperture is buys close, and a second position in which the valve aperture is biased open. The safety clip can be partially housed within the compliant seal member. The safety clip can be configured to move between a first position in which a portion of the safety clip outwardly biases a portion of the compliant seal member into interfering contact with an interior diameter of the interior cavity of the catheter hub, and a second position in which the outward bias of the safety clip against the compliant seal member is removed.

Another embodiment of the present disclosure provides a catheter hub assembly. The catheter hub assembly can include a catheter hub body, compliant seal member, proximal cup, and safety clip. The catheter hub body can have an open proximal end and a distal end defining an interior cavity therebetween. The compliant seal member can be disposed in the interior cavity of the catheter hub. The compliant seal member can have an open distal end and a proximal end defining a cavity therebetween. The proximal cup can be operably coupled to the compliant seal member. The proximal cup can have an open distal end and a proximal end defining a cavity therebetween. The cavity defined by the compliant member can adjoin with the cavity defined by the proximal cup to form a safety clip cavity. The safety clip can be housed within the safety clip cavity. The safety clip can be configured to move between a first position in which a portion of the safety clip outwardly biases a portion of the compliant seal member into interfering contact with the interior diameter of the interior cavity of the catheter hub, and a second position in which the outward bias of the safety clip against the compliant seal member is removed.

Another embodiment of the present disclosure provides a catheter hub assembly. The catheter hub assembly can include a catheter hub body and a compliant seal member. The catheter hub body can have an open proximal end and a distal end defining an interior cavity therebetween. The compliant seal member can be disposed in the interior cavity of the catheter hub. The compliant seal member can include a membrane defining a valve aperture configured to enable a needle cannula to selectively pass therethrough, and a wiper assembly positioned distal to the membrane configured to closely conform to an outer diameter of the needle cannula, so as to inhibit the passage of bodily fluid therethrough.

The summary above is not intended to describe each illustrated embodiment or every implementation of the present disclosure. The figures and the detailed description that follow more particularly exemplify these embodiments.

BRIEF DESCRIPTION OF THE DRAWINGS

The disclosure can be more completely understood in consideration of the following detailed description of various embodiments of the disclosure, in connection with the accompanying drawings, in which:

FIG. 1A is a perspective view depicting a conventional catheter insertion assembly, in which a catheter is coaxially positioned over a catheter insertion device.

FIG. 1B is a perspective view depicting the conventional catheter insertion assembly of FIG. 1A, in which the catheter is removed from the catheter insertion device.

FIG. 4A is a partial cross-sectional view depicting a catheter assembly and catheter insertion device in a first or ready for use position, in accordance with an embodiment of the disclosure.

FIG. 4B is a partial cross sectional view depicting the catheter assembly of FIG. 4A in a second or safe position, in accordance with an embodiment of the disclosure.

FIG. 9A is a partial perspective view depicting a first embodiment of a safety clip and a needle cannula, wherein the safety clip is in a first or ready for use position, in accordance with an embodiment of the disclosure.

FIG. 9B is a partial perspective view depicting the safety clip and needle cannula of FIG. 9A, wherein the safety clip is in a second or safe position, in accordance with an embodiment of the disclosure.

FIG. 9C is a perspective view depicting the safety clip of FIG. 9B in a free state, in accordance with an embodiment of the disclosure.

FIG. 9D is a profile view depicting the safety clip and needle cannula of FIG. 9B in the second or safe position.

FIG. 10A is a partial perspective view depicting a second embodiment of a safety clip and a needle cannula, wherein the safety clip is in a first or ready for use position, in accordance with an embodiment of the disclosure.

FIG. 10B is a partial perspective view depicting the safety clip and needle cannula of FIG. 10A, wherein the safety clip is in a second or safe position, in accordance with an embodiment of the disclosure.

FIG. 10C is a profile view depicting the safety clip and needle cannula of FIG. 10B in the second or safe position.

FIG. 12A is a partial perspective view depicting a fourth embodiment of a safety clip and needle cannula, wherein the safety clip is in a first or ready for use position, in accordance with an embodiment of the disclosure.

FIG. 12B is a partial perspective view depicting the safety clip and needle cannula of FIG. 12A, wherein the safety clip is in a second or safe position, in accordance with an embodiment of the disclosure.

FIG. 12C is a profile view depicting the safety clip and needle cannula of FIG. 12B in the second or safe position.

FIG. 13A is a partial perspective view depicting a fifth embodiment of a safety clip and needle cannula, wherein the safety clip is in a first or ready for use position, in accordance with an embodiment of the disclosure.

FIG. 13B is a partial perspective view depicting the safety clip and needle cannula of FIG. 13A, wherein the safety clip is in a second or safe position, in accordance with an embodiment of the disclosure.

FIG. 13C is a profile view depicting the safety clip and needle cannula of FIG. 13B in the second or safe position.

FIG. 13D is a cross-sectional end view depicting the safety clip and needle cannula of FIG. 13B in the first or ready for use position.

FIG. 15A is a perspective view depicting a seventh embodiment of a safety clip, in accordance with an embodiment of the disclosure.

FIG. 15B is a perspective view depicting the safety clip of FIG. 15A with a needle cannula, wherein the safety clip is in a second or safe position, in accordance with an embodiment of the disclosure.

FIG. 15C is a profile view depicting the safety clip and needle cannula of FIG. 15B in the second or safe position, in accordance with an embodiment of the disclosure.

FIG. 18A is a perspective view depicting a tenth embodiment of a safety clip, in accordance with an embodiment of the disclosure.

FIG. 18B is a perspective view depicting the safety clip of FIG. 18A with a needle cannula, wherein the safety clip is in a second or safe position, in accordance with an embodiment of the disclosure.

FIG. 18C is a profile view depicting the safety clip and needle cannula of FIG. 18B in the second or safe position, in accordance with an embodiment of the disclosure.

Figure 2A:
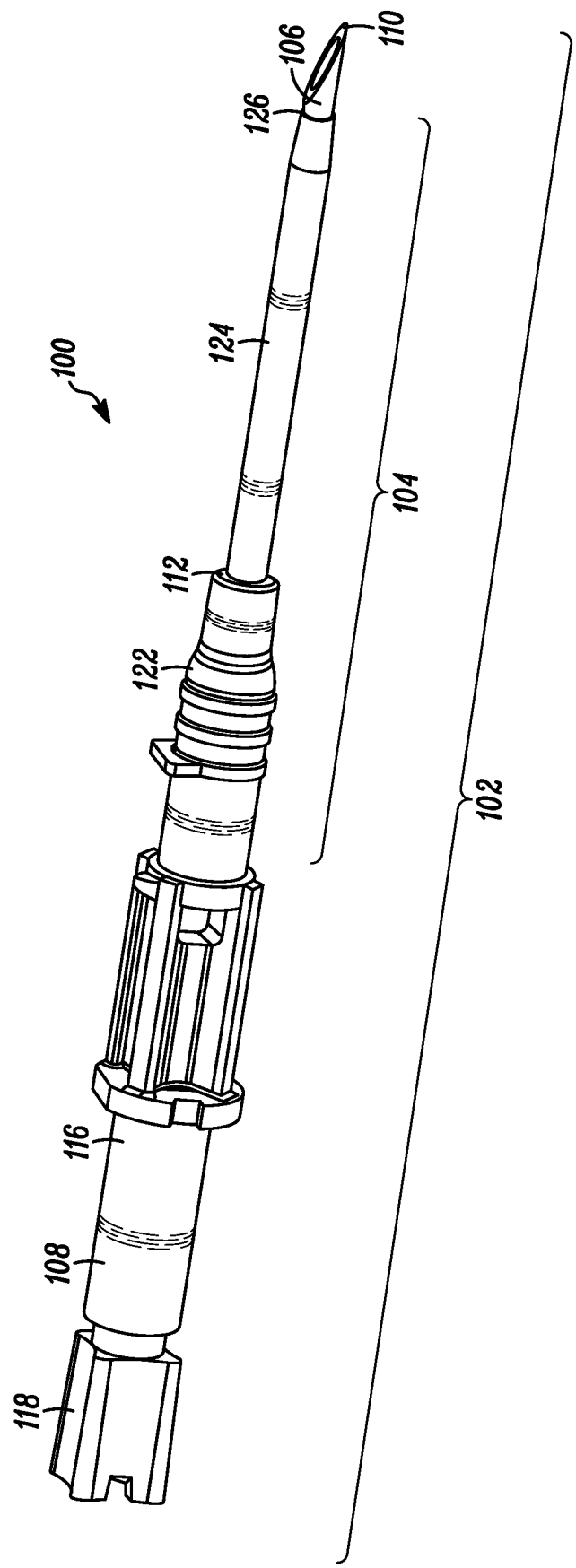
FIG. 2A is a perspective view depicting a safety catheter insertion assembly in a first or ready for use position, in accordance with an embodiment of the disclosure.

While embodiments of the disclosure are amenable to various modifications and alternative forms, specifics thereof shown by way of example in the drawings will be described in detail. It should be understood, however, that the intention is not to limit the disclosure to the particular embodiments described. On the contrary, the intention is to cover all modifications, equivalents, and alternatives falling within the spirit and scope of the subject matter as defined by the claims.

DETAILED DESCRIPTION

Various example embodiments of catheters are described herein for use in accessing the vein of a subject. It is to be appreciated, however, that the example embodiments described herein can alternatively be used to access the vascular of a subject at locations other than a vein, including but not limited to the artery of a subject. It is additionally to be appreciated that the term "clinician" refers to any individual that can perform a catheter insertion procedure with any of the example embodiments described herein or alternative combinations thereof. Similarly, the term "subject," as used herein, is to be understood to refer to an individual or object in which the catheter is to be inserted, whether human, animal, or inanimate. Various descriptions are made herein, for the sake of convenience, with respect to the procedures being performed by a clinician to access the vein of a subject, while the disclosure is not limited in this respect.

It is also to be appreciated that the term "distal," as used herein, refers to the direction along an axis that lies parallel to a needle cannula of a safety catheter assembly that is closest to the subject during catheter insertion. Conversely, the term "proximal," as used herein, refers to the direction lying along the axis parallel to the needle cannula that is further away from the subject when the catheter is inserted into the vein of the subject, opposite to the distal direction.

Referring to FIGS. 1A-B, a conventional catheter insertion assembly 50 is depicted. Details of the conventional catheter insertion assembly 50 are described in the Background section above.

Figure 2B:
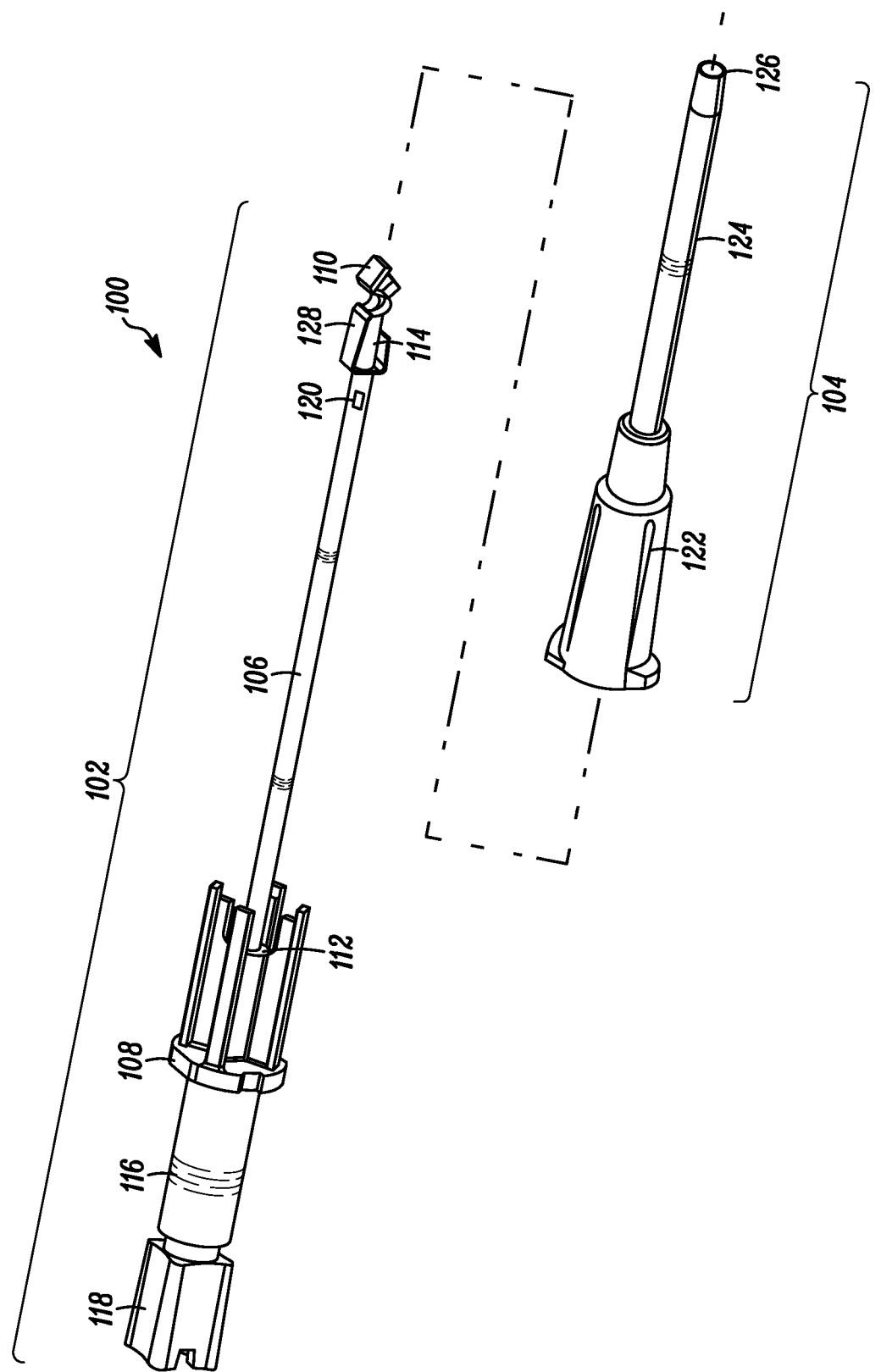
FIG. 2B is a perspective view depicting the catheter insertion assembly of FIG. 2A in a second or safe position, in accordance with an embodiment of the disclosure.
Figure 3:
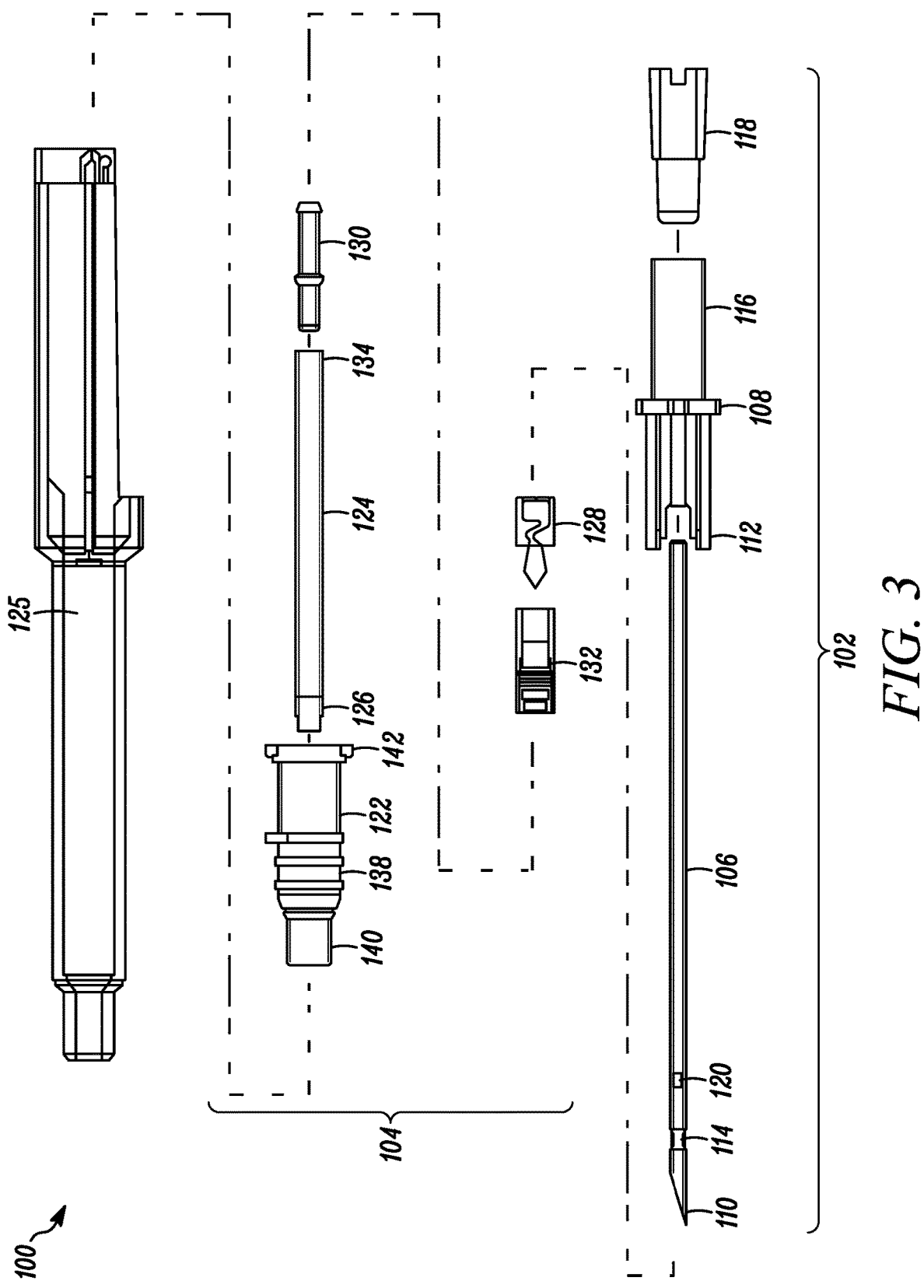
FIG. 3 is an exploded view depicting a safety catheter insertion assembly, in accordance with an embodiment of the disclosure.

Referring to FIGS. 2A-B, perspective views of a safety catheter insertion assembly 100 are depicted in accordance with an embodiment of the disclosure. FIG. 3 depicts an exploded view of a safety catheter insertion assembly 100 in accordance with an embodiment of the disclosure. The safety catheter assembly 100 can include a catheter insertion device 102 and a catheter assembly 104. The catheter insertion device 102 can include an insertion or needle cannula 106 operably coupled to a needle hub 108. The needle cannula 106 can include an elongate cylindrically shaped metal structure defining a lumen that extends between the sharpened distal needle tip 110 and a proximal end 112. The sharp distal needle tip 110 can be constructed and arranged to pierce the skin of a subject during catheter insertion. For example, in one embodiment, the sharp distal tip 110 can include a V-point designed to reduce the penetration force used to penetrate the needle 106 and a portion of the catheter insertion assembly 104 through the skin, tissue, and vein wall of a subject. In one embodiment, the length of the needle 106 can be extended to aid in the insertion of the catheter assembly 104 into obese patients.

The needle cannula 106 can further include a transition 114 having a different cross-sectional size and are shaped then other portions of the needle 106 positioned proximal to the transition 114. Needle transition 114 (alternatively referred to as a needle bump or cannula bump) can be created by crimping opposed sides of the needle cannula 106, or otherwise disrupting the structure of the needle 106, so that the outer surfaces of the needle 106 extend to a larger radial position than other portions of the needle cannula 106, as measured from the center of the needle axis. Needle transitions 114 can be formed differently, according to alternative embodiments, such as by adding material to the exterior of the needle, among other ways.

The proximal end 112 of the needle cannula 106 can be operably coupled to the needle hub 108. The needle hub 108 can include a gripping portion for manipulation by a clinician. In one embodiment, the catheter insertion device 102 can be constructed to provide a visual indication of flashback when the sharpened distal tip 110 of the needle 106 enters the vein of a subject. In this embodiment, the needle hub 108 includes a flash chamber 116 in fluid communication with the lumen of the needle. When the sharp distal tip 110 enters a vein during catheter insertion, blood or bodily fluid enters the needle lumen from the vein and flows proximally through the needle 106 into the flash chamber 116. The flash chamber 116 can be sealed at one end by a flash plug 118. The flash plug 118 can be made out of an air permeable, hydrophilic material that enables the passage of air, but inhibits the passage of liquid. Air that resides in the needle lumen and flash chamber 116 is therefore pushed through the flash plug 118 by the incoming blood, until the blood reaches the flash plug 118 or is otherwise stopped. The needle hub 108, or portions thereof, can be constructed of a clear or translucent material configured to enable a clinician to view the presence of blood within the flash chamber 116. In this respect, the clinician can be alerted when the needle has entered the vein of the subject by the presence of blood in the flash chamber 116.

In one embodiment, features of the catheter insertion device 102, other than a flash chamber 116, can provide an indication that the sharp distal tip 110 has entered the vein of a subject. For example, the needle cannula 106 can include a notch 120. In this embodiment, blood flow enters the needle lumen when the sharpened distal tip 110 enters the vein. As blood flows proximally in the needle lumen, some blood passes through the notch 120 and into an annular space that lies between an exterior of the needle 106 and an interior of the catheter assembly 104. The presence of blood in the annular space can be viewed by a clinician through a clear or translucent portion of the catheter assembly 104, thereby providing an indication that the sharpened distal tip 110 is present in a vein.

As depicted in FIG. 2A, the safety catheter insertion assembly 100 can be provided in the first or ready for use position, in which the catheter assembly 104 is connected to the catheter insertion device 102. In particular, the catheter assembly 104, which can include a catheter hub 122 and a catheter tube 124, can be positioned over the needle cannula 106 of the catheter insertion device 102, with a sharp distal tip 110 of the needle 106 protruding from a distal end 126 of the catheter tube 124. In some embodiments, the safety catheter assembly 100 can be provided for use in a sterilized and assembled state, contained within a sealed package.

To insert the catheter into the vein of a subject, a clinician first removes the safety catheter assembly 100 from the packaging. A needle sheath 125 (as depicted in FIG. 3) covering the needle cannula 106 can be removed to expose the sharp distal tip 110 of the needle cannula 106. The clinician then punctures an identified site on the patient or subject with the sharp distal tip 110 and urges the needle cannula 106 forward until the sharp distal tip 110 and a portion of the catheter tube 124 enters the vein of the subject.

The catheter assembly 104 can then be moved distally over the needle 106, threading the catheter assembly 104 into the vein of the subject as the catheter insertion device 102 is held stationary. With the catheter assembly 104 positioned as desired, the clinician can withdraw the needle cannula 106 from the patient's vein by pulling the catheter insertion device 102 proximally away from the subject while holding the catheter assembly 104 generally stationary with respect to the subject. The catheter insertion device 102 is pulled proximally until the needle cannula 106 is separated from the catheter assembly 104.

As depicted in FIG. 2B, the catheter insertion device 102 can be separated or removed from the catheter assembly 104 according to a second or safe position. In some embodiments, a safety clip 128 can be operably coupled to either of the catheter assembly 104 and/or the catheter insertion device 102, and positioned over the sharp distal tip 110 prior to separation of the catheter insertion device 102 from the catheter assembly 104 for the purpose of inhibiting unwanted needle sticks. In the safe position, the clinician can dispose of the catheter insertion device 102 in a sharps container.

Referring to FIG. 4A, a partial cross sectional view of a safety catheter assembly 100 in a first or ready for use position is depicted in accordance with an embodiment of the disclosure. Referring to FIG. 4B, a partial cross sectional view of a catheter assembly 104 in a second position is depicted in accordance with an embodiment of the disclosure. The catheter assembly 104 can include a catheter hub 122, catheter tube 124, safety clip 128, actuator 130, and seal member 132. In some embodiments, the catheter assembly 104 can further include a wing assembly, an extension tube, an extension tube clamp, a needleless connector, and/or a vent cap (not depicted). Accordingly, the catheter assembly 104 can include a blood control feature configured to inhibit blood from escaping after withdrawal of the needle cannula 106, thereby reducing the risk of exposure of blood or other bodily fluids to clinicians, particularly a consideration of sensitivity where blood-borne diseases may be present. Additionally, embodiments of the catheter assembly 104 can inhibit the introduction of unwanted contaminants into the interior of the catheter assembly 104 prior to the connection to an IV fluid supply.

The catheter tube 124 can extend from a tapered distal end 126 to a proximal end 134, where the catheter tube 124 can be operably coupled to the catheter hub 122. The catheter tube 124 can define a lumen 136 configured to provide a fluid pathway between a vein of a subject and the catheter hub 122. In one embodiment, the catheter tube 124 can include a barium radio opaque line to ease in the identification of the catheter tube 124 during radiology procedures.

Figure 8A:
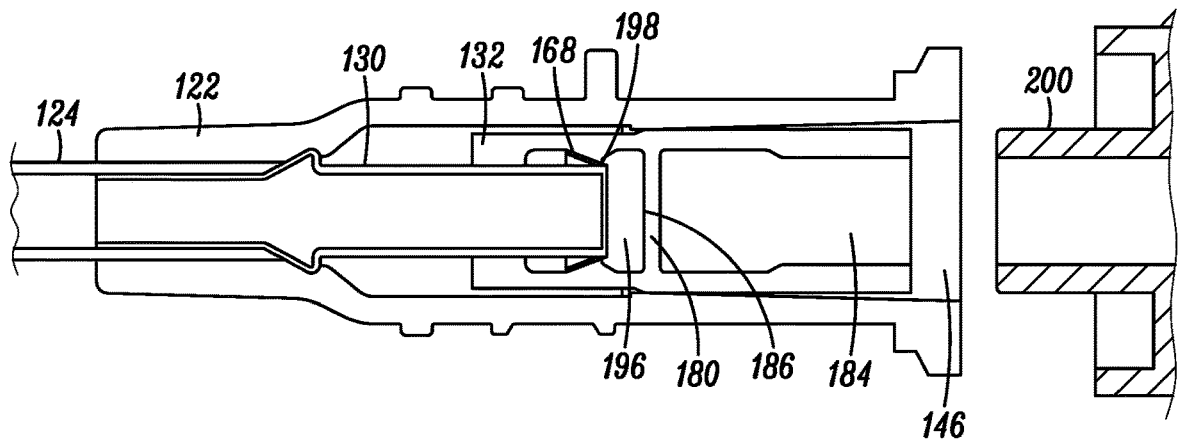
FIG. 8A is a partial cross-sectional view depicting a catheter assembly and luer taper, wherein a seal member of the catheter assembly is in a closed position, in accordance with an embodiment of the disclosure.
Figure 8B:
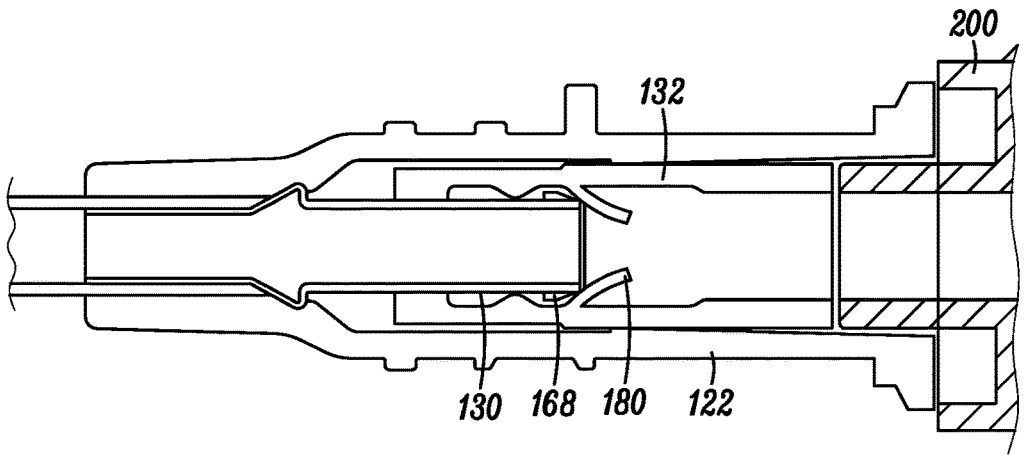
FIG. 8B is a partial cross-sectional view depicting the catheter assembly and luer taper of FIG. 8A, wherein the seal member is in transition between the closed position and an open position, in accordance with an embodiment of the disclosure.
Figure 8C:
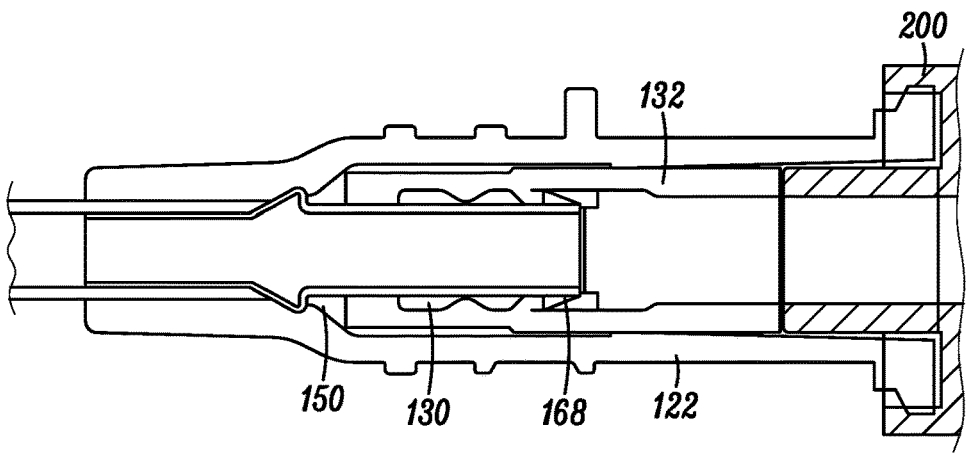
FIG. 8C is a partial cross-sectional view depicting the catheter assembly and luer taper of FIG. 8B, wherein the seal member is in an open position, in accordance with an embodiment of the disclosure.

The catheter hub 122 can include a catheter hub body 138 having a distal end 140, a proximal end 142 and an internal wall 144 defining an interior cavity 146 therebetween. The interior cavity can include a proximal portion 148 extending from the open proximal end 142, and a distal portion 150 in closer proximity to the distal end 140. In one embodiment, the distal end 140 of the catheter hub body 138 is operably coupled to the proximal end 134 of the catheter tube 124, such that the lumen 136 of the catheter tube 124 is in fluid communication with the proximal portion 148 of the interior cavity 146. The proximal portion 148 of the interior cavity 146 is shaped according to luer taper standards, so as to matingly receive a luer taper 200 (as depicted in FIGS. 8A-C).

The actuator 130 can be secured proximal to the distal end 140 of the catheter hub 122, so as to extend axially within the interior cavity 146. In one embodiment, the proximal end 134 of the catheter tube 124 can be secured within the interior cavity 146 of the catheter hub 122 with the aid of actuator 130. The seal member 132, alternatively referred to as a blood control valve 132, can also be secured within the interior cavity 146 of the catheter hub 122 with the aid of the actuator 130, such that the seal member 132 is axially shiftable relative to the actuator 130 between a closed or sealed position, and an open or actuated position. Thus, the actuator 130 functions to both secure the catheter tube 124 to the catheter hub 122, and to support the seal member 132.

Figure 5:
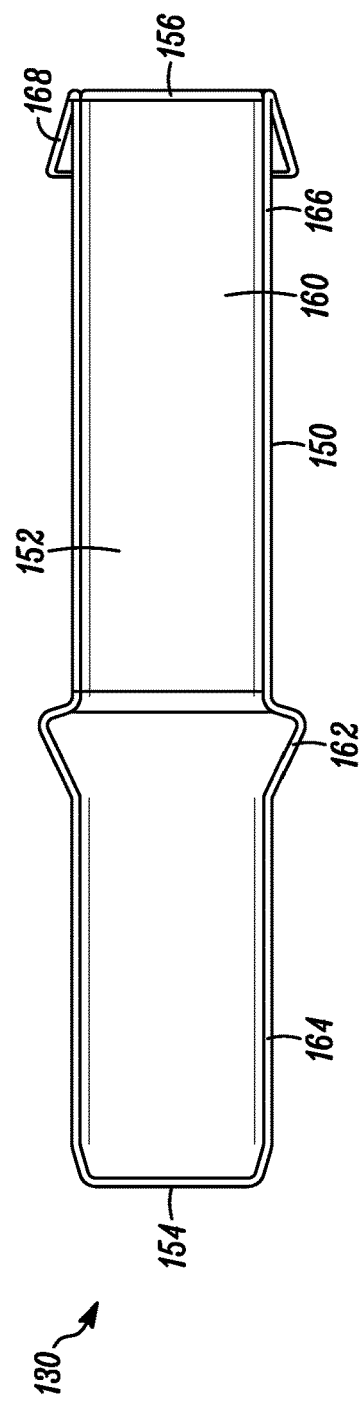
FIG. 5 is a cross-sectional view depicting an actuator in accordance with an embodiment of the disclosure.

Referring to FIG. 5, a cross-sectional view of an actuator 130 is depicted in accordance with an embodiment of the disclosure. The actuator 130 can be generally rigid and can include a generally cylindrical body 152 having a distal end 154, a proximal end 156 and a wall 158 defining an interior cavity 160 therebetween. For example, in one embodiment, the actuator 130 can be formed of a medical grade stainless steel through processes generally known in the art. In one embodiment, the interior cavity 160 is configured to receive the needle cannula 106 therethrough, without interference with the needle transition 114. At times when the needle cannula is withdrawn, the interior cavity 160 can be configured to enable the passage of bodily fluid therethrough. In one embodiment, the wall 158 can further define an annular rib 162 dividing the cylindrical body 152 into a distal portion 164 and a proximal portion 166. In some embodiments, the distal end 154 can be tapered, and the proximal end 156 can include a flange 168. In one embodiment, the flange 168 can be formed by bending or folding a portion of the wall 158 at more than a 90° angle, such that in some embodiments a portion of the wall 158 is folded back upon itself.

As depicted in FIGS. 4A-B, the distal portion 164 of the actuator 130 can be frictionally fit within the proximal end 134 of the catheter tube 124, which can be frictionally fit within the interior cavity 146 of the catheter hub 122, such that, the catheter tube 124 extends distally from the distal end 140 of the catheter hub 122. The annular rib 162 can serve to enhance the frictional fitting of the actuator 130 within the interior cavity 146 of the catheter hub 122. Accordingly, the actuator 130 can be positioned within the catheter hub such that the free proximal portion 166 extends proximally within the interior cavity 146 of the catheter hub 122.

As depicted in FIGS. 4A-B, the seal member 132 (i.e. blood control valve) is disposed within the interior cavity 146 of the catheter hub 122 and is supported therein in part by the actuator 130, and in part by the internal wall 144 of the catheter hub 122, such that the seal member 132 is shiftable between a closed position in which the flow of bodily fluid from the catheter tube 124 into the interior cavity 146 of the catheter hub 122 is inhibited or restricted, and an open position in which the seal member 132 is shifted relative to the actuator 130 thereby enabling the flow of bodily fluid from the catheter tube 124 into the proximal portion 148 of the interior cavity 146 of the catheter hub 122, as will be explained in further detail below.

Figure 6B:
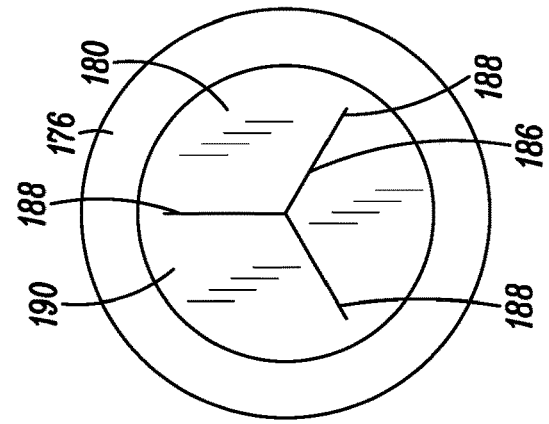
FIG. 6B is a proximal end view depicting the seal member of FIG. 6A.
Figure 6A:
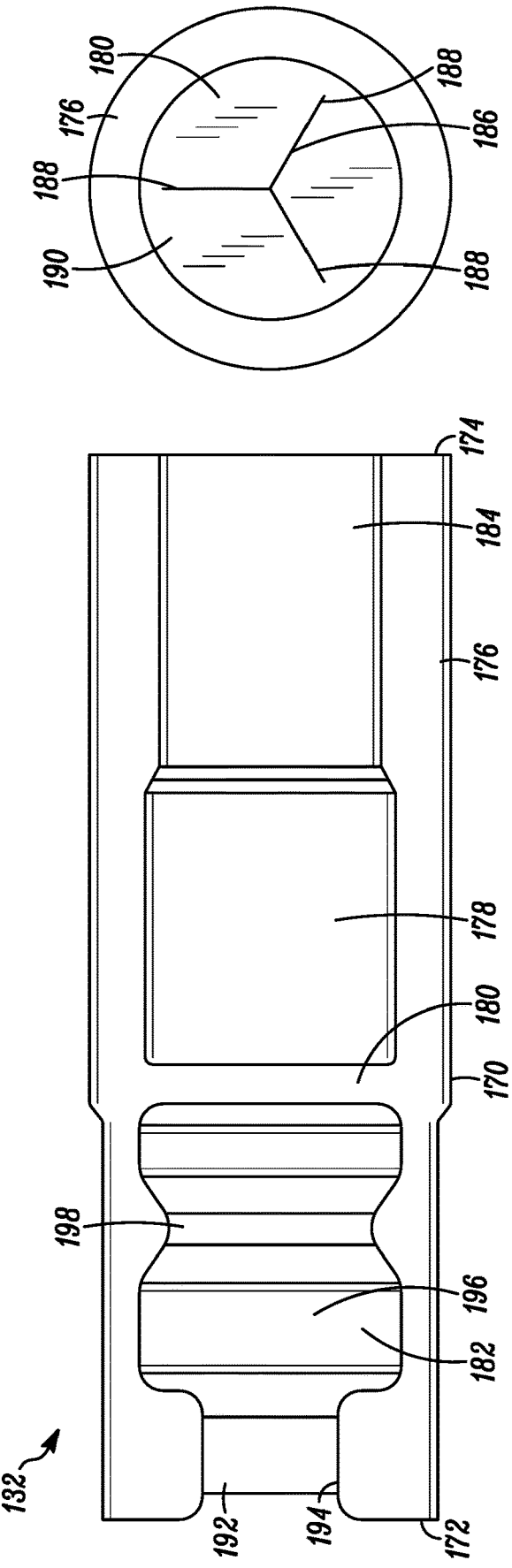
FIG. 6A is a cross-sectional view depicting a seal member in accordance with an embodiment of the disclosure.

Referring to FIG. 6A, a cross-sectional view of the seal member 132 is depicted in accordance with an embodiment of the disclosure. Referring to FIG. 6B, a proximal end view of the seal member 132 is depicted in accordance with an embodiment of the disclosure. The seal member 132 can be generally elastic or resilient, and can include a generally cylindrical body 170 having a distal end 172, a proximal end 174, and a wall 176 defining an interior cavity 178 therebetween. In one embodiment, the seal member 132 can be formed from suitable materials including, for example, silicone or polyisoprene by processes generally known in the art.

In one embodiment, the wall 176 can further include a membrane 180 dividing the interior cavity 178 into a distal portion 182 and a proximal portion 184. In one embodiment, the membrane 180 can extend substantially orthogonal to a central longitudinal axis of the cylindrical body 170. The membrane 180 can define a slit 186, which can be normally biased closed when the seal member 132 is in a relaxed, uncompressed state. The slit 186 can take several forms recognized in the art and could, for example, be a single straight slit (not shown) through the membrane 180. As depicted in FIG. 6B, in one embodiment, the slit 186 can have a tri-slit configuration that extends to three radially outermost ends 188 to present a generally Y-shape configuration. The slit 186 defines a plurality of membrane flaps 190, the number of which depends on the particular configuration of the slit 186 (e.g., three flaps 190 for a tri-slit configuration).

In one embodiment, the slit 186 can be shaped and sized to closely conform to an outer diameter of the needle cannula 106, so as to inhibit leakage, particularly during proximal withdrawal of the needle cannula 106, and without increasing the actuation force necessary to withdraw the needle cannula 106 from the catheter hub 122. For example, in some embodiments, the length of the slit 186 (e.g., its radial extent) can closely approximate the width of a 14 gauge needle (0.06525 inches), 16 gauge needle (0.05025 inches), 18 gauge needle (0.03575 inches), or 20 gauge needle (0.02825 inches). In some embodiments, the length of the slit 186 can measure approximately 0.075 inches, 0.070 inches, 0.060 inches, 0.055 inches, 0.045 inches, 0.040 inches, or 0.035 inches. Additionally, the length of the slit 186 is preferably less than a cross dimension (e.g., diameter) of the membrane 180, such that the radially outermost ends 188 of the slit 186 are spaced from, and the slit 186 does not penetrate into, the wall 176 of the cylindrical body 170.

In a first or ready for use position of the safety catheter assembly 100 (as depicted in FIG. 4A), the slit 186 in the membrane 180 and the needle cannula 106 can cooperate so as to inhibit or restrict the flow of bodily fluid around the outer diameter of the needle cannula 106 when the needle cannula 106 extends through the membrane 180. In some embodiments, the slit 186 and the needle cannula 106 may not form a fluid tight seal, but rather may provide a significant restriction to the flow of bodily fluid therethrough, such that a de minimis amount of blood may seep through the slit 196 of the membrane 180 during insertion of the catheter tube 124 into the vasculature of a patient. In another embodiment, the seal member 132 can include a secondary membrane or wiper 202 configured to further restrict or inhibit the flow of bodily fluid and generally improve the seal during advancement.

Figure 7:
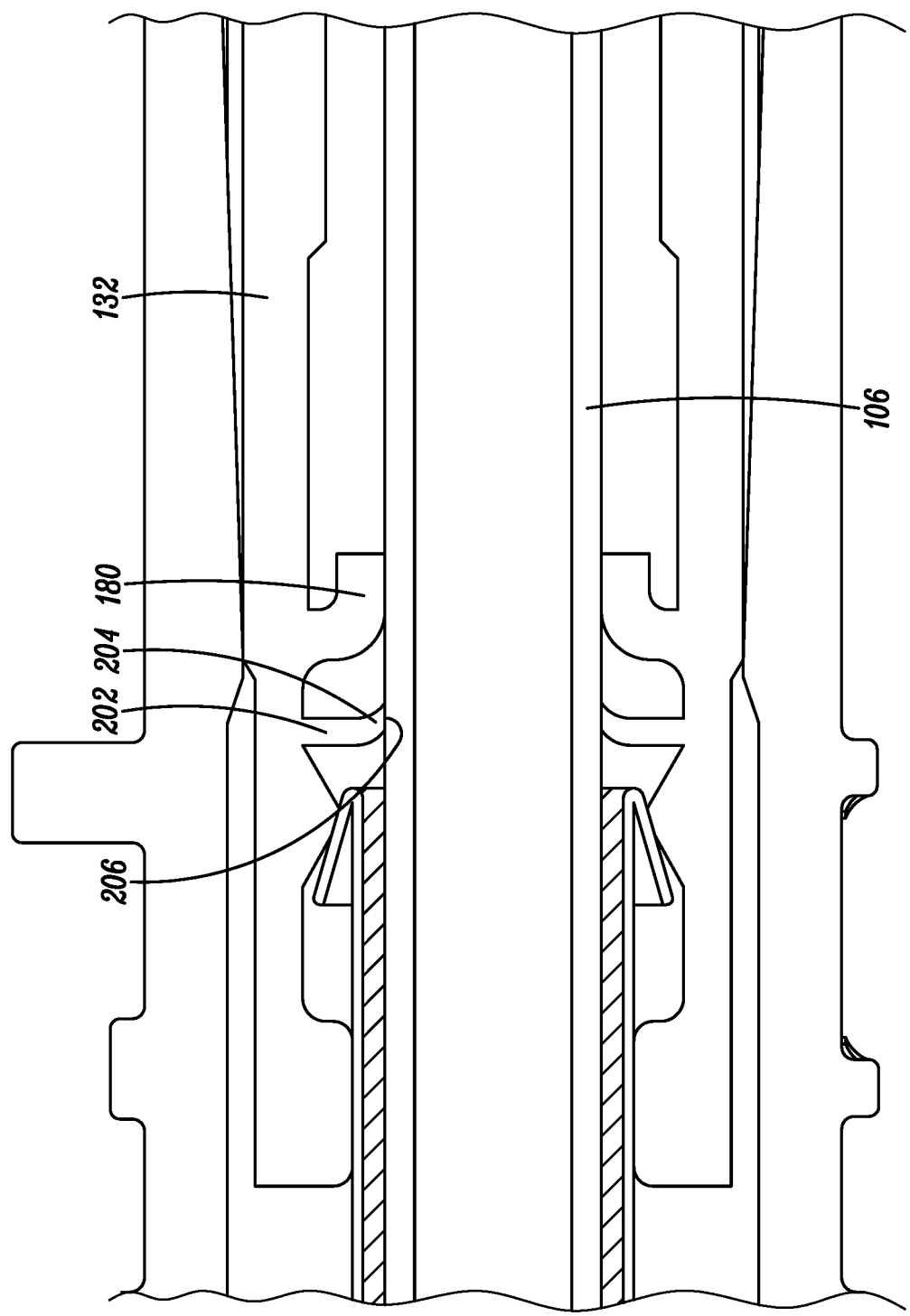
FIG. 7 is partial cross-sectional view depicting a catheter assembly having a seal member with the wiper and a needle cannula passing therethrough, in accordance with an embodiment of the disclosure.

Referring to FIG. 7, a partial cross sectional view of a catheter assembly 104 having a seal member 132 with a wiper 202 and a needle cannula 106 passing therethrough is depicted in accordance with an embodiment of the disclosure. In one embodiment, the wiper 202 can be configured as a membrane 204 defining an aperture 206. In one embodiment, the aperture 206 can be round. In contrast to the slit 186 which can be normally biased closed when the needle cannula 106 is removed, the aperture 206 can have a cross dimension slightly smaller than the outer diameter of the needle cannula 106, and therefore, although closely conforming to and/or having a slight interference with the outer diameter of the needle cannula 106 when the needle cannula 106 is positioned within the seal member 132, the aperture 206 can remain open when the needle cannula 106 is removed. In one embodiment, the wiper 202 is positioned distal to the membrane 180, thereby inhibiting the flow of bodily fluid to the membrane 180 when the needle cannula 106 is positioned within the seal member 132. In other embodiments, the wiper 202 can be positioned proximal to the membrane.

With continued reference to FIG. 6A, the distal portion 182 of the interior cavity 178 can include a sealing outlet bore 192 defined by an annular sealing lip 194 extending inward from the distal end 172, and an actuator cavity 196 between the sealing outlet bore 192 and the membrane 180. With additional reference to FIG. 8A, a cross-sectional view of a catheter assembly 104 in which the seal member 132 is in a closed position is depicted in accordance with an embodiment of the disclosure. The proximal portion 166 of the actuator is receivable through the sealing outlet bore 192 and into the actuator cavity 196 with the flange 168 contained in the actuator cavity 196. The actuator cavity 196 can include a narrowed portion 198 that provides the actuator cavity 196 with an hourglass shape. In one embodiment, the narrowed portion 196 can be provided by an annular rib projecting generally radially inward from the portion of the wall 176 defining the actuator cavity 196. In one embodiment, the flange 168 is completely contained within the actuator cavity 196. For example, in one embodiment, a frustoconical surface of the flange 168 of the seal member 132 can engage with the annular rib of the narrowed portion 198. The flange 168 can have an outermost cross diameter larger than a cross diameter of the sealing outlet bore 192, and can be configured to enable the sealing outlet bore 192 to be slid distally over the flange 168, but restrict proximal movement of the seal member 132 back over the flange 168. Accordingly, in the closed position (as depicted in FIG. 8A), with the flange 168 position within the actuator cavity 196, the slit 186 of the membrane 180 can be naturally biased closed so as to inhibit the flow of fluid therethrough.

As depicted in FIGS. 8B-C, upon insertion of a luer taper 200, the seal member 132 can be shifted distally relative to the actuator 130, so as to cause the flange 168 to push against the membrane 180, thereby causing the slit 186 of the membrane 180 to at least partially open. The proximal portion 184 of the interior cavity 178 can be generally cylindrical, and can extend between the membrane 180 and an opening in the proximal end 174 of the seal member 132. In one embodiment, the proximal portion 184 can have a generally constant cross dimension, configured such that a standard dimension luer taper 200 cannot pass into the interior cavity 178 of the seal member 132, but instead will, at most, impact against the proximal end 174 of the seal member 132.

As the seal member 132 axially shifts within the catheter hub 122, the proximal portion 166 of the actuator 130 contacts the membrane 180 and starts penetrating through the slit 186, thereby causing the flaps 190 formed by the slit 186 to hinge or distend and slide along the flange 168 (e.g., along the frustoconical surface thereof), so as to gradually open the slit 186. Continued distal insertion of the luer taper 200 causes the seal member 132 to shift axially until the luer taper 200 is fully extended into the interior cavity 146 of the catheter hub 122, with the distal end 172 of the seal member 132 moved forward, or against a distal portion 150 of the interior cavity 146, thereby defining the open position of the seal member 132 (as depicted in FIG. 8C). When the seal member 132 is in the open position, an unobstructed fluid path is established between the catheter tube 124 and the luer taper 200 via the actuator 130, such as for administration of fluids to, or withdrawal of blood or other bodily fluid from, the patient with the catheter assembly 104.

In one embodiment, the membrane 180 is sufficiently resilient such that the flange 168 can penetrate the slit 186 without ripping or otherwise destroying the membrane 180. The slit 186 can then close back down around the actuator 130 after the flange 168 passes therethrough. In another embodiment, the membrane 180 can be deformed, ripped, or otherwise destroyed, as the flange 168 penetrates through the slit 186. Accordingly, in one embodiment, the seal member 132 is a one-time use seal. In this regard, after removal of the luer taper 200 from the catheter hub 122, the seal member 132 will not move back proximally to the closed position, but will instead remain in the open position. In one embodiment, the flange 168 can be configured to enable movement of the seal member 132 in the distal direction, but discourage movement of the seal member 132 and the opposite, proximal direction. Thus, in one embodiment, the membrane 180 does not automatically move back over the flange 168 to close off the established fluid flow path, but instead provides an unobstructed fluid flow path between the catheter tube 124 and the interior cavity 146 and/or the open proximal end 142 of the catheter hub 122. In another embodiment, the catheter assembly 104 can be provided with a mechanism, such as a spring, elastic, or bellows, to provide a driving force to axially shift the seal member 132 back in the proximal direction, so as to shift the seal member 132 to the closed position. In one embodiment, the mechanism configured to provide a driving force to axially shift the seal member 132 back in the proximal direction can be integral to the seal.

The safety clip 128 can at least partially reside within the proximal portion 184 of the seal member 132, and can be configured to axially slide along the needle cannula 106 between a first or ready for use position (as depicted in FIG. 2A), in which the needle cannula 106 traverses through the safety clip 128, and a second or safe position (as depicted in FIG. 2B), in which the sharp distal tip 110 is captured within the safety clip 128 for the purpose of inhibiting unwanted needlesticks.

Referring to FIGS. 9A-D, a first embodiment of the safety clip is depicted in accordance with an embodiment of the disclosure. FIG. 9A depicts the safety clip 128 in the first or ready for use position, in which the needle cannula 106 passes through portions of the safety clip 128. FIG. 9B depicts the safety clip 128 in the second or safe position, in which the sharp distal tip 110 of the needle cannula 106 is captured within the safety clip 128.

In one embodiment, the safety clip 128 can include a proximal wall 208 and one or more guard arms 210. The proximal wall 208 can define an aperture 212 configured to be positioned around or over the needle cannula 106. In some embodiments, the proximal wall 208 and the aperture 212 can be configured to engage the needle transition 114 to inhibit distal advancements of the safety clip 128 off of the sharp distal tip 110 of the needle cannula 106. In one embodiment, the surface 214 of the proximal wall 208 can be substantially orthogonal to the longitudinal axis 216 of the needle cannula 106. In other embodiments, the surface 214 can be positioned at an oblique or acute angle with respect to the longitudinal axis 216 of the needle cannula 106.

The one or more guard arms 210 can extend distally from the proximal wall 208. In one embodiment, the safety clip 128 can include a pair of guard arms 210A/210B. The safety clip 128 can be formed of a generally resilient material, for example medical grade stainless steel, such that guard arms 210 have a natural bias towards a free or relaxed state when portions of the safety clip 128 are deflected away from the free state. For example, in one embodiment, the safety clip 128 is in the free state when the safety clip 128 is in the second or safe position. Accordingly, in this embodiment, when the safety clip 128 is in the first or ready for use position the guard arms 210A-B are biased against the needle cannula 106, as the presence of the needle cannula 106 causes the guard arms 210A-B to be deflected away from their free state. When the needle cannula 106 is retracted, and the sharp distal tip 110 moves proximally between the guard arms 210, the guard arms 210 naturally bias towards their free state, thereby capturing the sharp distal tip 110 therebetween. In some embodiments, further proximal movement of the sharp distal tip 110 is inhibited by a cross dimension of the needle transition 114 being larger than the aperture 212 in the proximal wall of the safety clip. In some embodiments, distal movement of the sharp distal tip 110 is inhibited by a distal portion of at least one of the arms 210A-B.

In one embodiment, a first guard arm 210A can include a linear portion 218, a curved portion 220, and a distal wall 222. The linear portion 218 can be adjacent to the proximal wall 208, such that the linear portion 218 and the proximal wall 208 are separated by a bend 224. In one embodiment, the bend 224 can form an angle of between 80-90°, although other angles of the bend 224 are also contemplated.

The curved portion 220 can be adjacent to the linear portion 218. In some embodiments, the curved portion 220 can have a reduced width 226 relative to the width 228 of the linear portion 218, such that the curved portion 220 at least partially conforms to an outer diameter of the needle cannula 106. In one embodiment, the curved portion 220 can further define a needle cannula guide surface or profile cutout 230 configured to at least partially conform to the needle cannula 106. Accordingly, the reduced width 226 and profile cutout 230 of the curved portion 220 can be configured to maintain the position of the safety clip 128 along the needle cannula 106, particularly as the needle cannula 106 is retracted and moved with respect to the safety clip 128. In one embodiment, an apex 231 of the curved portion 220 can extend towards the longitudinal axis 216 of the needle cannula 106, when the needle cannula 106 is positioned within the safety clip 218. In some embodiments, the apex 231 only extends beyond the longitudinal axis 216 of the needle cannula 106 in the second or safe position, and does not extend beyond the longitudinal axis 216 in the first or ready for use position. Accordingly, in some embodiments, the guard arms 210A-B are non-intersecting (i.e., the guard arms 210A-B do not cross or intersect one another along the longitudinal axis 216 of the needle cannula 106). Note that the non-intersecting guard arms (i.e., the guard arms that do not cross or intersect one another along a longitudinal axis of the needle cannula 106) can apply to any embodiment of a needle clip disclosed herein.

The distal wall 222 can be adjacent to the curved portion 220. In some embodiments, the distal wall 222 can be angled towards the longitudinal axis 216 of the needle cannula 106, when positioned within the safety clip 218. In one embodiment, the distal wall 222 can further include a lip or hook 232 on the distal end of the distal wall 222. In one embodiment the hook 232 can include a curved surface configured to contact and/or slide along the needle cannula 106, when the needle cannula 106 is positioned within the safety clip 218. In one embodiment, once the sharp distal tip 110 of the needle cannula 106 moves proximally past the hook 232, the hook 232 can be configured to inhibit the sharp distal tip 110 from moving back distally past the hook 232 and out of the safety clip 128.

The distal wall can further include one or more tabs 234 positioned on either lateral side of the distal wall 222, such that the one or more tabs 234 can be configured to serve as an aid in retaining the sharp distal tip 110 of the needle cannula 106 in the second or safe position. The one or more tabs 234 can additionally serve to contact a portion of an opposing guard arm 210B, for the purpose of maintaining alignment of the guard arms 210A-B in the second or safe position.

In one embodiment, a second guard arm 210B can also include a linear portion 218B, a curved portion 220B and a distal wall 222B having a similar configuration to that of the first guard arm 210A. In some embodiments, the second guard arm 210B can be slightly shorter than the first guard arm 201A, such that in the second or safe position, a hook 232B of the second guard arm 210B can be positioned proximal to the hook 232 of the first guard arm 210A. Additionally, in some embodiments, the curved portion 220B of the second guard arm 210B can be positioned proximal to the curved portion 220 of the first guard arm 210A, such that in the second or safe position the guard arms 210A-B are non-intersecting (i.e., the guard arms 210A-B do not cross or intersect one another along the longitudinal axis 216 of the needle cannula 106). In one embodiment, the width 226 of the curved portion 220B of the second guard arm 210B can be positioned on the opposite lateral side as the width 226 of the curved portion 220A of the first guard arm 210A, so as to inhibit intersection of the guard arms 210A-B in the second or safe position.

Referring to FIGS. 10A-C, a second embodiment of a safety clip 300 is depicted in accordance with the disclosure. FIG. 10A depicts the safety clip 300 in the first or ready for use position, in which the needle cannula 106 passes through portions of the safety clip 300. FIG. 10B depicts the safety clip 300 in the second or safe position, in which the sharp distal tip 110 of the needle cannula 106 is captured within the safety clip 300.

In one embodiment, the safety clip 300 can include a proximal wall 308 and one or more guard arms 310A-B. The guard arms 310 can include a linear portion 318, a curved portion 320, and a distal wall 322. In one embodiment, the curved portion 320 of the safety clip 300 can define a needle cannula guide surface or profile cutout notch 330 between the lateral edges 336, 338 of the guard arm 310A, such that the curved portion 330 forms a pair of curved tines 340, 342, having an overall reduced width 326A/B in comparison to the width 328 of the linear portion 318. The profile cutout notch 330 can be configured to maintain the position of the safety clip 300 along the needle cannula 106, particularly as the needle cannula 106 is retracted and moved with respect to the safety clip 300. Other portions of the safety clip 300 can be similar to the structures in other safety clip embodiments disclosed herein.

Figure 10D:
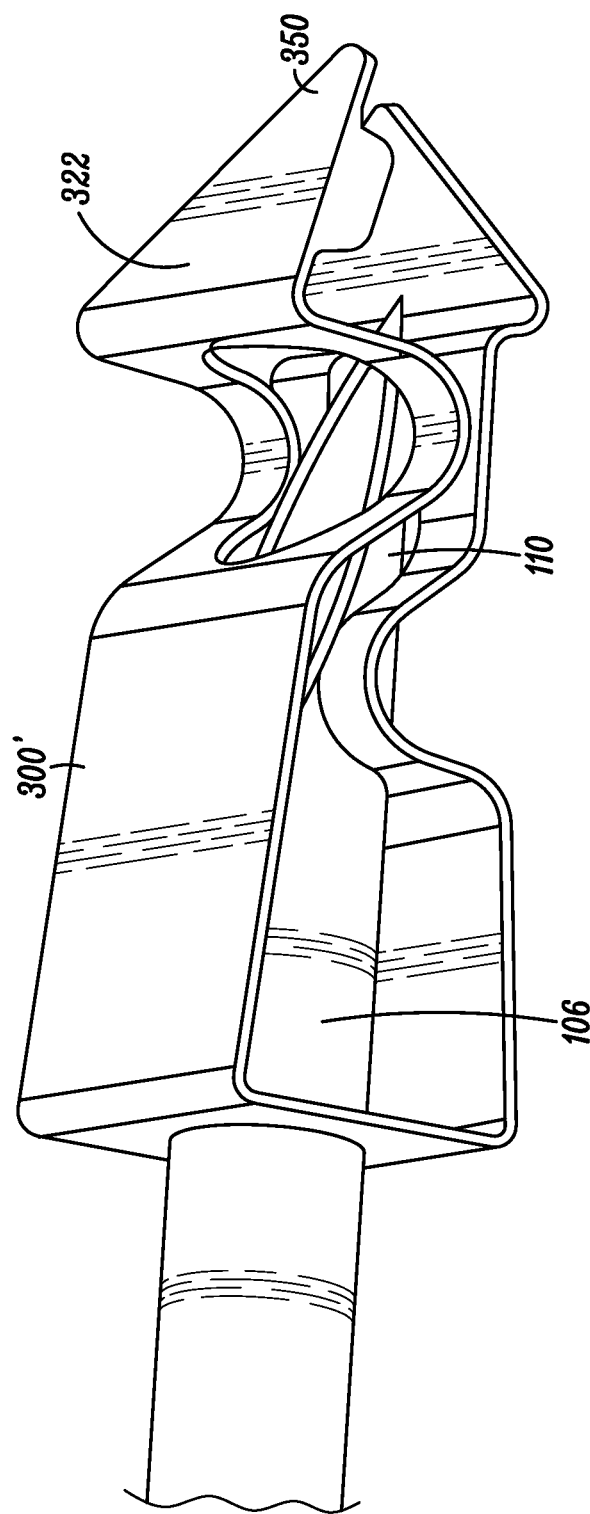
FIG. 10D is a partial perspective view depicting a safety clip and needle cannula having a cone-shaped distal wall, in accordance with an embodiment of the disclosure.

Referring to FIG. 10D, in an alternative configuration, the distal walls 322 of the safety clip 300' can have a decreasing width, so as to generally form a distal cone 350. In this configuration, the distal cone 350 can serve as an aid in loading and containing the sharp distal tip 110 of the needle cannula 106.

Figure 10E:
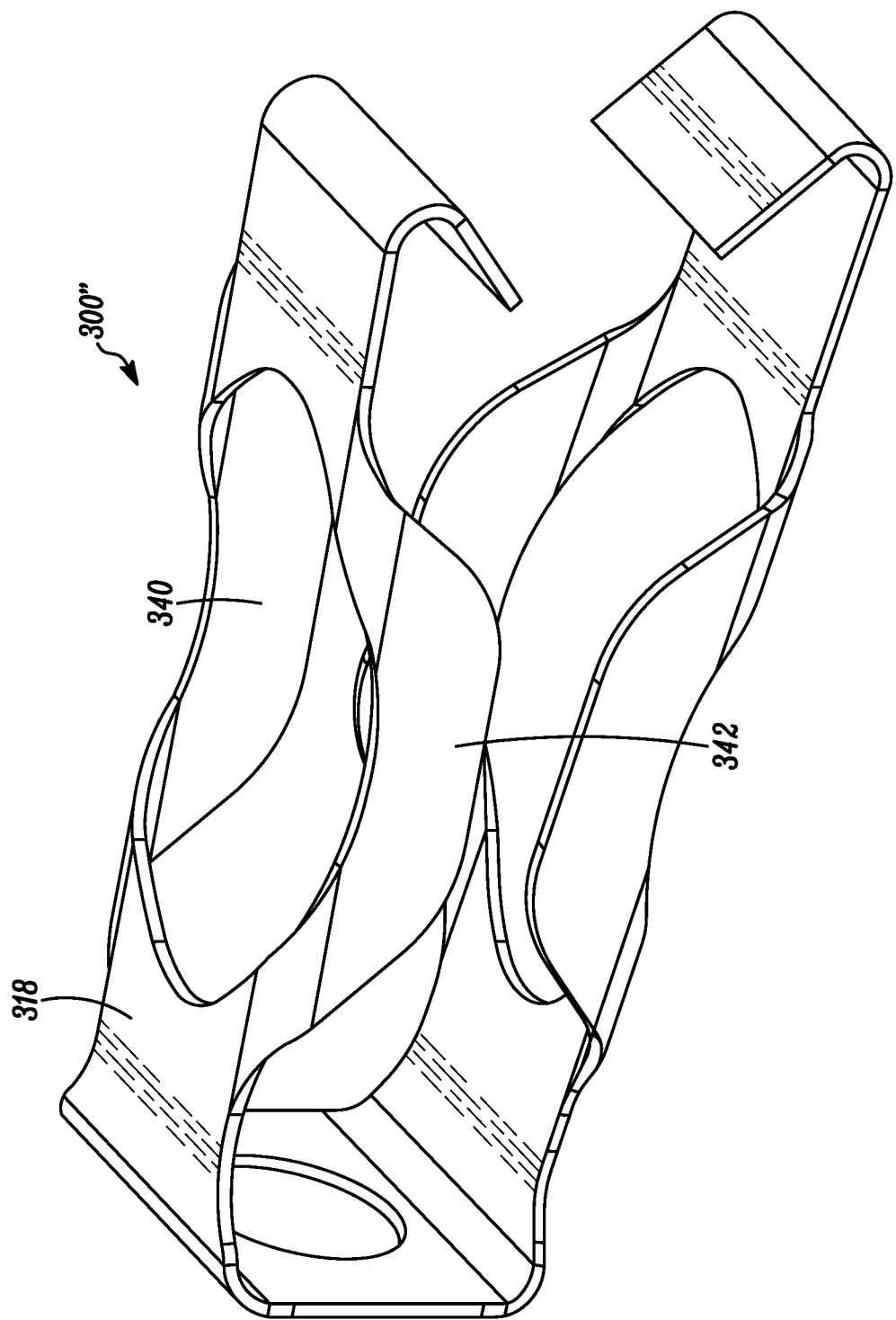
FIG. 10E is a perspective view depicting a safety clip having twisted tines, in accordance with an embodiment of the disclosure.

Referring to FIG. 10E, in yet another configuration, the tines 340, 342 of the safety clip 300" can include a twist or partial rotation relative to the linear portion 318. In this configuration, the tines 340, 342 can be more closely conformed to the surface of the needle cannula 106, thereby serving as an aid in maintaining the position of the safety clip 300" along the needle cannula 106, particularly as the needle cannula 106 is retracted and moved with respect to the needle clip 300".

Figure 11A:
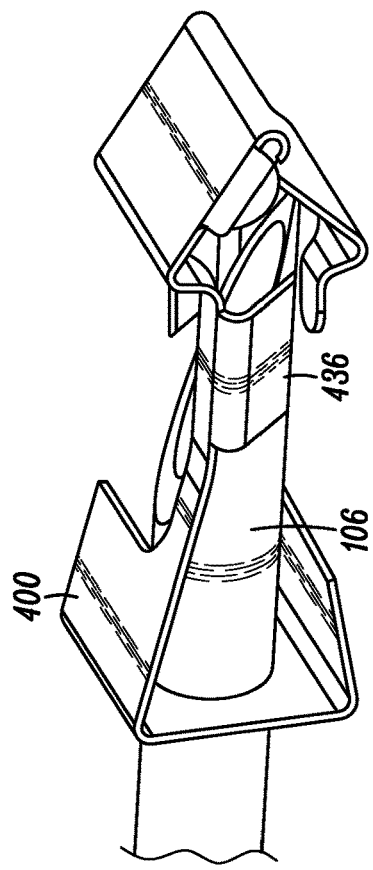
FIG. 11A is a partial perspective view depicting a third embodiment of a safety clip and needle cannula, wherein the safety clip is in a first or ready for use position, in accordance with an embodiment of the disclosure.
Figure 11B:
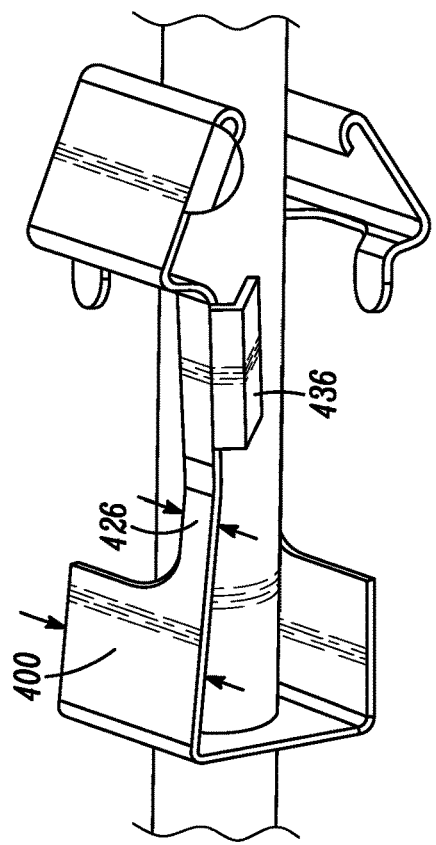
FIG. 11B is a partial perspective view depicting the safety clip and needle cannula of FIG. 11A, wherein the safety clip is in a second or safe position, in accordance with an embodiment of the disclosure.

Referring to FIGS. 11A-D, a third embodiment of a safety clip 400 is depicted in accordance with the disclosure. FIG. 11A depicts the safety clip 400 in the first or ready for use position, in which the needle cannula 106 passes through portions of the safety clip 400. FIG. 11B depicts the safety clip 400 in the second or safe position, in which the sharp distal tip 110 of the needle cannula 106 is captured within the safety clip 400.

In one embodiment, the safety clip 400 can include a proximal wall 408 and one or more guard arms 410A-B. The guard arms 410A-B can include a linear portion 418, a tabbed portion 420, and a distal wall 422. The linear portion 418 can be adjacent to the proximal wall 408, such that the linear portion 418 and the proximal wall 408 are separated by a bend 424. In one embodiment, the bend 424 can form an angle of between 70-90°, although other angles of the bend 424 are also contemplated.

The tabbed portion 420 can be adjacent to the linear portion 418. In some embodiments, the tabbed portion 420 can have a reduced width 426 relative to the width 428 of the linear portion 418. In one embodiment, the tabbed portion 420 can include one or more tabs 436. The one or more tabs 436 can be configured to maintain the position of the safety clip 400 along the needle cannula 106, particularly as the needle cannula 106 is retracted and moved with respect to the safety clip 400. In one embodiment, the tabbed portions 420 contains the needle cannula 106 in the second or safe position. In one embodiment, an extension surface 431 of the tabbed portion 420 can extend towards the longitudinal axis 216 of the needle cannula 106, when the needle cannula 106 is positioned within the safety clip 400. In some embodiments, the extension surface 431 only extends beyond the longitudinal axis 216 of the needle cannula 106 in the second or safe position, and does not extend beyond the longitudinal axis 216 in the first or ready for use position. Accordingly, in some embodiments, the guard arms 410A-B are non-intersecting (i.e., the guard arms 410A-B do not cross or intersect one another along the longitudinal axis 216 of the needle cannula 106).

Figure 11D:
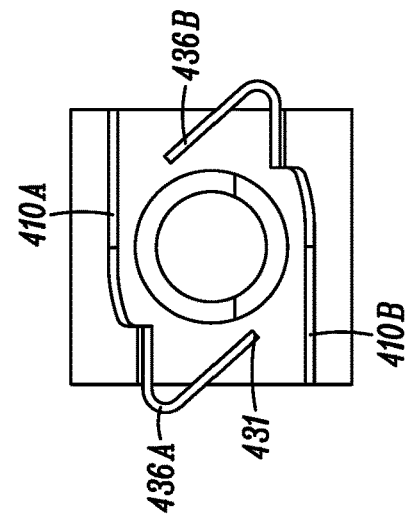
FIG. 11D is a cross-sectional end view depicting the safety clip and needle cannula of FIG. 11B in the first or ready for use position.
Figure 11C:
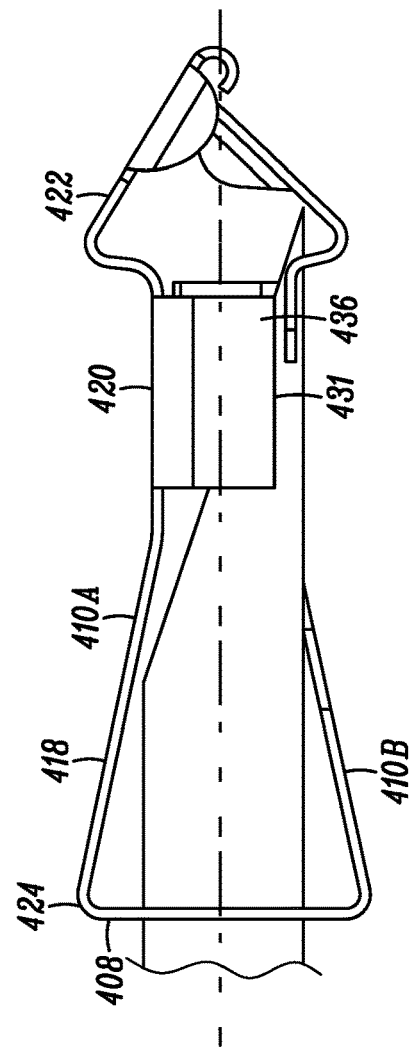
FIG. 11C is a profile view depicting the safety clip and needle cannula of FIG. 11B in the second or safe position.

As depicted in FIG. 11D, in one embodiment, a tabbed portion 420B of the second guard arm 410B can be aligned with the tabbed portion 420A of the first guard arm 410A, with the tab 436B of the second guard arm 210B positioned on the opposite lateral side as the tab 436A of the first guard arm 410A, so as to inhibit intersection of the guard arms 410A-B in the second or safe position. Other portions of the safety clip 400 can be similar to the structures in other safety clip embodiments disclosed herein.

Referring to FIGS. 12A-C, a fourth embodiment of a safety clip 500 is depicted in accordance with the disclosure. FIG. 12A depicts the safety clip 500 in the first or ready for use position, in which the needle cannula 106 passes through portions of the safety clip 500. FIG. 12B depicts the safety clip 500 in the second or safe position, in which the sharp distal tip 110 of the needle cannula 106 is captured within the safety clip 500.

In one embodiment, the safety clip 500 can include a proximal wall 508 and one or more guard arms 510A-B. The guard arms 510A-B can include a linear portion 518, a tabbed portion 520, and a distal wall 522. In one embodiment, the tabbed portion 520 can be present on both guard arms 510A-B. In other embodiments, the tabbed portion 520 can be present on a single guard arm 510A/B. In one embodiment, the tabbed portion 520 of the safety clip 500 can define a needle cannula guide surface or profile cutout notch 530 between the lateral edges 536, 538 of the guard arm 510A, such that the tabbed portion 520 forms a pair of tines 540, 542, having an overall reduced width 526A/B in comparison to the width 528 of the linear portion 518. The profile cutout notch 530 and/or tabbed portion 520 can be configured to maintain the position of the safety clip 500 along the needle cannula 106, particularly as the needle cannula 106 is retracted and moved with respect to the safety clip 500, and/or when approaching or in the second or safe position. Other portions of the safety clip 500 can be similar to the structures in other safety clip embodiments disclosed herein.

Referring to FIG. 13A-D, a fifth embodiment of a safety clip 600 is depicted in accordance with the disclosure. FIG. 13A depicts the safety clip 600 in the first or ready for use position, in which the needle cannula 106 passes through portions of the safety clip 600. FIG. 13B depicts the safety clip 600 in the second or safe position, in which the sharp distal tip 110 of the needle cannula 106 is captured within the safety clip 600.

Similar to the fourth embodiment, the first guard arm 610A can include a tabbed portion 620 defining a needle cannula guide surface or profile cutout notch 630 between the lateral edges 636, 638 of the guard arm 610A, such that the tabbed portion 630 forms a pair of tines 640, 642. In this embodiment, a pair of tabs 644, 646 can be configured to maintain the position of the safety clip 600 along the needle cannula 106, particularly as the needle cannula 106 is retracted and moved with respect to the safety clip 600. In one embodiment, the outermost surfaces 645, 647 of the tabs 644, 646 can extend towards the longitudinal axis 216 of the needle cannula 106, when the needle cannula 106 is positioned within the safety clip 600. In some embodiments, the surfaces 645, 647 only extend beyond the longitudinal axis 216 of the needle cannula 106 in the second or safe position, and do not extend beyond the longitudinal axis 216 in the first or ready for use position. In some embodiments, the second guard arm 610B does not include any tabs. Accordingly, in some embodiments, the guard arms 610A-B are non-intersecting (i.e., the guard arms 610A-B do not cross or intersect one another along the longitudinal axis 216 of the needle cannula 106).

Figure 14A:
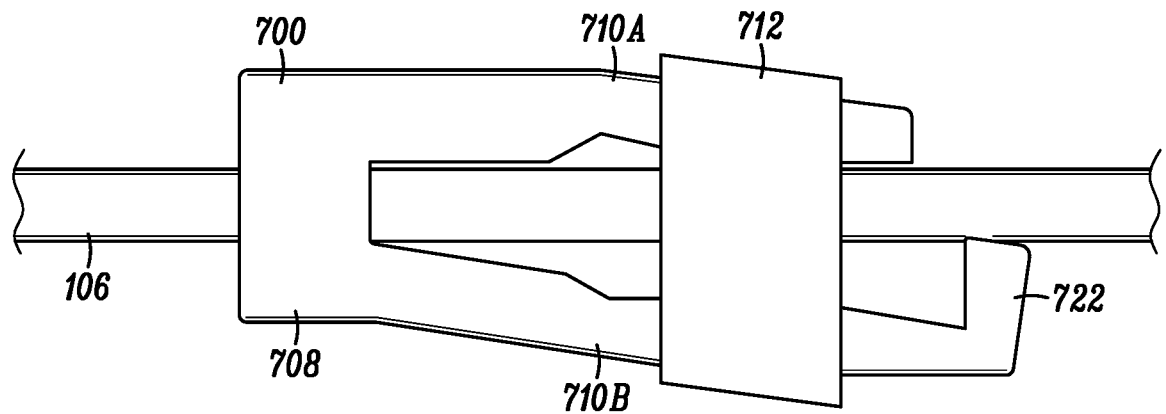
FIG. 14A is a partial perspective view depicting a sixth embodiment of a safety clip and needle cannula, wherein the safety clip is in a first or ready for use position, in accordance with an embodiment of the disclosure.
Figure 14B:
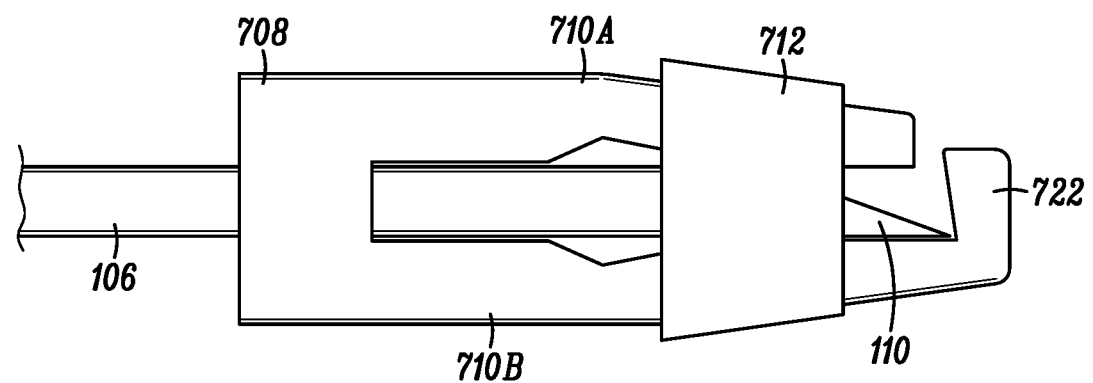
FIG. 14B is a partial perspective view depicting the safety clip and needle cannula of FIG. 14A, wherein the safety clip is in a second or safe position, in accordance with an embodiment of the disclosure.

Referring to FIG. 14A-B, a sixth embodiment of a safety clip 700 is depicted in accordance with the disclosure. FIG. 14A depicts the safety clip 700 in the first or ready for use position, in which the needle cannula 106 passes through portions of the safety clip 700. FIG. 14B depicts the safety clip 700 in the second or safe position, in which the sharp distal tip 110 of the needle cannula 106 is captured within the safety clip 700.

In one embodiment, the safety clip 700 can include a proximal wall 708, a pair of guard arms 710A-B, and an elastomeric band 712 positioned around the guard arms 700A-B, so as to bias the guard arms 700A-B towards one another. As in previous embodiments, the proximal wall 708 can define an aperture shaped and sized to enable at least a portion of the needle cannula 106 to pass therethrough, but to inhibit passage of the needle transition 114 therethrough, thereby inhibiting distal advancement of the safety clip 700 off of the sharp distal tip 110 of the needle cannula 106.

The guard arms 710A-B can extend distally from the proximal wall 708, and can be formed of a generally flexible material, such that the guard arms 710A-B are generally pivotable relative to the proximal wall 708. The elastomeric band 712 can be positioned around a portion of the guard arms 710A-B, thereby providing a bias of the guard arms 710A-B towards one another. Accordingly, in this embodiment, when the safety clip 128 is in the first or ready for use position the guard arms 710A-B are biased against the needle cannula 106. In one embodiment, one of the guard arms 710B can include a distal wall 722 configured to inhibit advancement of the needle cannula 106 when the needle cannula 106 is retracted, and the guard arms 710A-B are biased towards one another and shifted to the second safe position, thereby safely capturing the sharp distal tip 110 of the needle cannula 106 within the safety clip 700.

Referring to FIGS. 15A-C, a seventh embodiment of a safety clip 800 is depicted in accordance with the disclosure. FIG. 15A depicts the safety clip 800 alone or separate from the needle cannula 106. FIGS. 15B-C depict the safety clip 800 and the second or safe position, in which the sharp distal tip 110 of the needle cannula 106 is captured within the safety clip 800.

In one embodiment, the safety clip 800 can include a proximal wall 802 and one or more guard arms 804. The proximal wall 802 can define aperture 806 configured to be positioned around or over the needle cannula 106. In some embodiments, the proximal wall 802 and the aperture 806 can be configured to engage the needle transition 114 to inhibit distal advancements of the safety clip 800 off of the sharp distal tip 110 of the needle cannula 106. In one embodiment, the surface 808 of the proximal wall 802 can be substantially orthogonal to a longitudinal axis of the needle cannula 106. In other embodiments, the surface 808 can be positioned at an oblique or acute angle with respect to the longitudinal axis of the needle cannula 106.

The one or more guard arms 804 can extend distally from the proximal wall 802. In one embodiment, the safety clip 800 can include a pair of guard arms 804A/804B. The safety clip 800 can be formed (e.g., stamped) from a generally resilient material, for example medical grade stainless steel, such that the guard arms 804 have a natural bias towards a free or relaxed state when portions of the safety clip 800 are deflected away from the free state. For example, in one embodiment, the safety clip 800 is in a free state when the safety clip 800 is in the second or safe position. Accordingly, in this embodiment, when the safety clip 800 is in the first or ready for use position, the guard arms 804A/B are biased against the needle cannula 106, as the presence of the needle cannula 106 causes the guard arms 804A/B to be deflected away from their free state. When the needle cannula 106 is retracted, and the sharp distal tip 110 moves proximally between the guard arms 804A/B, the guard arms 804A/B naturally bias towards their free state, thereby capturing the sharp distal tip 110 therebetween. In some embodiments, further proximal movement of the sharp distal tip 110 is inhibited by a cross dimension of the needle transition 114 being larger than the aperture 806 in the proximal wall 802 of the safety clip 800. In some embodiments, distal movement of the sharp distal tip 110 is inhibited by a distal portion of at least one of the arms 804A/B.

In one embodiment, a first guard arm 804A can include a proximal portion 810, a linear portion 812, and a distal wall 814. The proximal portion 810 can be adjacent to the proximal wall 802, such that the proximal portion 810 and the proximal wall 802 are separated by a bend 816. In one embodiment, the bend 816 can form an angle of between about 60-110°, although other angles of the bend 816 are also contemplated.

The linear portion 812 can be adjacent to the proximal portion 810, such that the linear portion 812 and the proximal portion 810 are separated by a second bend 818. In one embodiment, the bend 818 can form an angle of between about 90-180°, although other angles of the bend 818 are also contemplated. In one embodiment, the linear portion 812 can include one or more tabs 820A-D positioned on either lateral side of the linear portion 812, such that the tabs 820A-D are configured to at least partially conform to an outer diameter of the needle cannula 106. Accordingly, the one or more tabs 820A-D of the linear portion 812 can be configured to maintain the position of the safety clip 800 along the needle cannula 106, particularly as the needle cannula 106 is retracted and moved with respect to the safety clip 800.

The distal wall 814 can be adjacent to the linear portion 812. In some embodiments, the distal wall 814 can be angled toward the longitudinal axis of the needle cannula, when positioned within the safety clip 800. In one embodiment, the distal wall 814 can further include a lip or hook 822 on the distal end of the distal wall 814. In one embodiment, the hook 822 can include a curved surface configured to contact and/or slide along the needle cannula 106, when the needle cannula 106 is positioned within the safety clip 800. In one embodiment, once the sharp distal tip 110 of the needle cannula 106 moves proximally pass the hook 822, the hook 822 can be configured to inhibit the sharp distal tip 110 for moving back distally past the hook 822 and out of the safety clip 800.

In one embodiment, the second guard arm 804B can also include a proximal portion, linear portion 812B, and distal wall having a similar configuration to that of the first guard arm 804A. In some embodiments, the second guard arm 804B can be slightly longer than the first guard arm 804A, such that in the second or safe position, the hook 822 of the first guard arm 804A can be positioned proximal to a hook of the second guard arm 804B. In one embodiment, the second guard arm 804B can include a corresponding one or more tabs 824A-D positioned on either lateral side of the linear portion, such that the tabs 824A-D are configured to at least partially conform to an outer diameter of the needle cannula 106. In one embodiment, the one or more tabs 824A-D can be configured to mesh with the one or more tabs 820A-D of the first guard arm 804A, when the safety clip 800 is in the second or safe position.

Figure 16B:
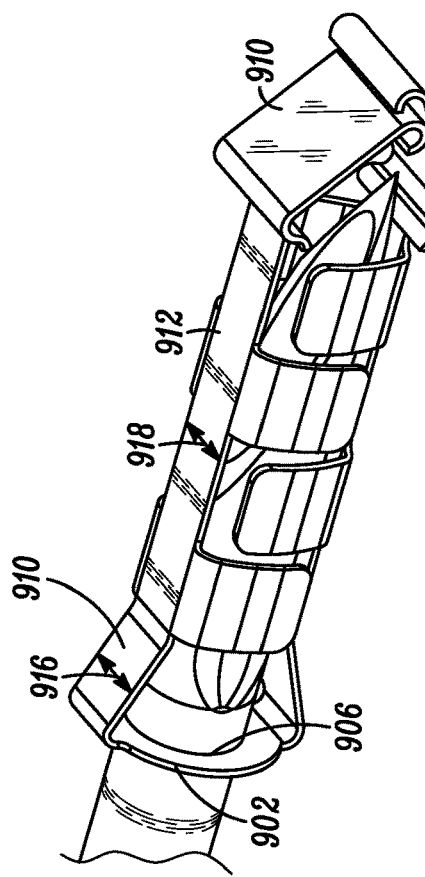
FIG. 16B is a perspective view depicting the safety clip of FIG. 16A with a needle cannula, wherein the safety clip is in a second or safe position, in accordance with an embodiment of the disclosure.
Figure 16C:
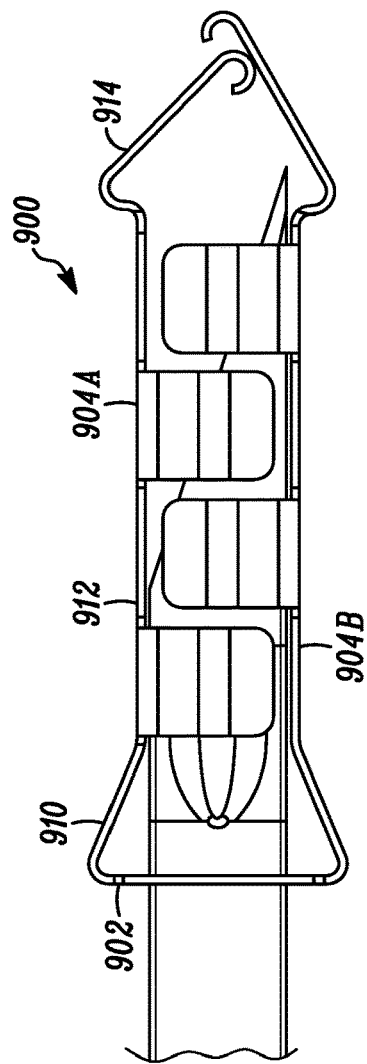
FIG. 16C is a profile view depicting the safety clip and needle cannula of FIG. 16B in the second or safe position, in accordance with an embodiment of the disclosure.
Figure 16A:
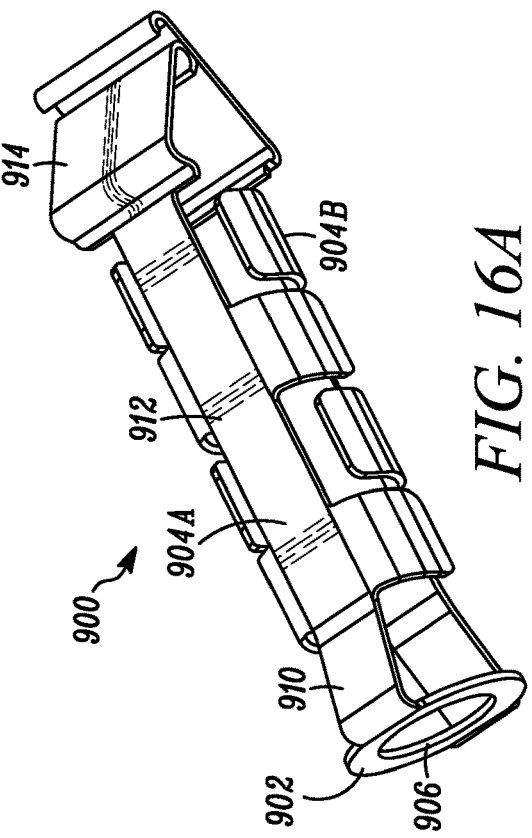
FIG. 16A is a perspective view depicting an eighth embodiment of a safety clip, in accordance with an embodiment of the disclosure.

Referring to FIGS. 16A-C, and eighth embodiment of a safety clip 900 is depicted in accordance with the disclosure. FIG. 16A depicts the safety clip 900 alone, separate from the needle cannula 106. FIGS. 16B-C depict the safety clip 900 and the second or safe position, in which the sharp distal tip 110 of the needle cannula 106 is captured within the safety clip 900.

In one embodiment, safety clip 900 can share structural similarities to previously discussed safety clips (e.g., safety clip 800). For example, safety clip 900 can include a proximal wall 902 defining an aperture 906, and one or more guard arms 904A/B having a proximal portion 910, linear portion 912, and distal wall 914. In one embodiment, the proximal wall 902 can generally be circular in shape or otherwise generally correspond to the shape of the aperture 906. In one embodiment, the width 916 of the proximal portion 910 can be approximately equal to the width 918 of the linear portion 912. In other embodiments, the width 916 of the proximal portion 910 can be larger or smaller than the width 918 of the linear portion 912.

Figure 17B:
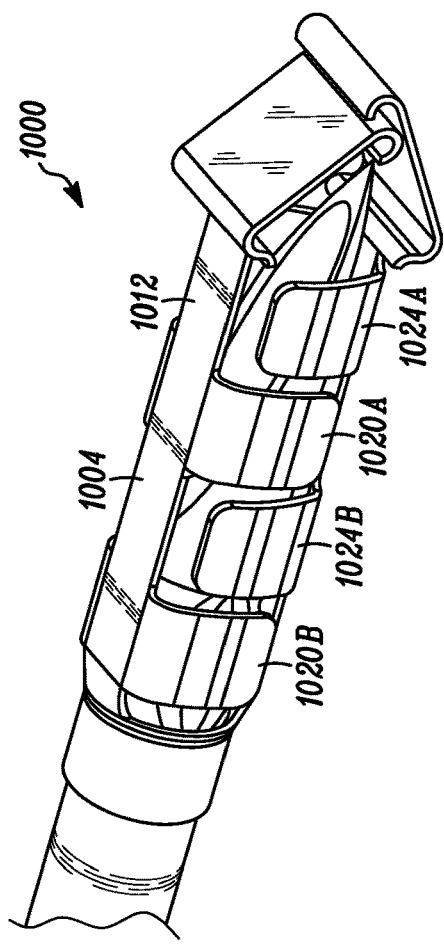
FIG. 17B is a perspective view depicting the safety clip of FIG. 17A with a needle cannula, wherein the safety clip is in a second or safe position, in accordance with an embodiment of the disclosure.
Figure 17C:
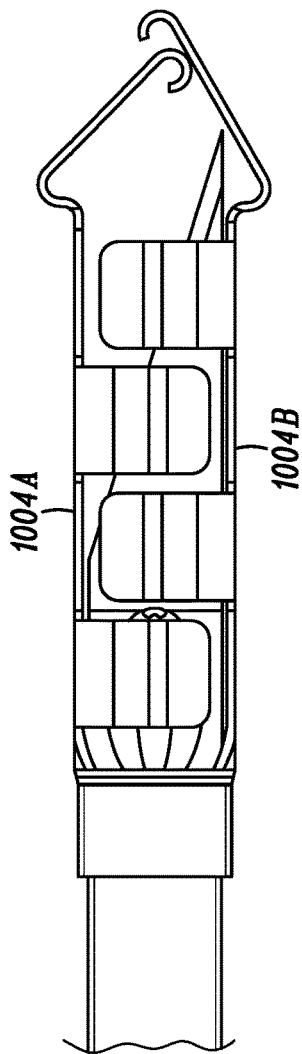
FIG. 17C is a profile view depicting the safety clip and needle cannula of FIG. 17B in the second or safe position, in accordance with an embodiment of the disclosure.
Figure 17A:
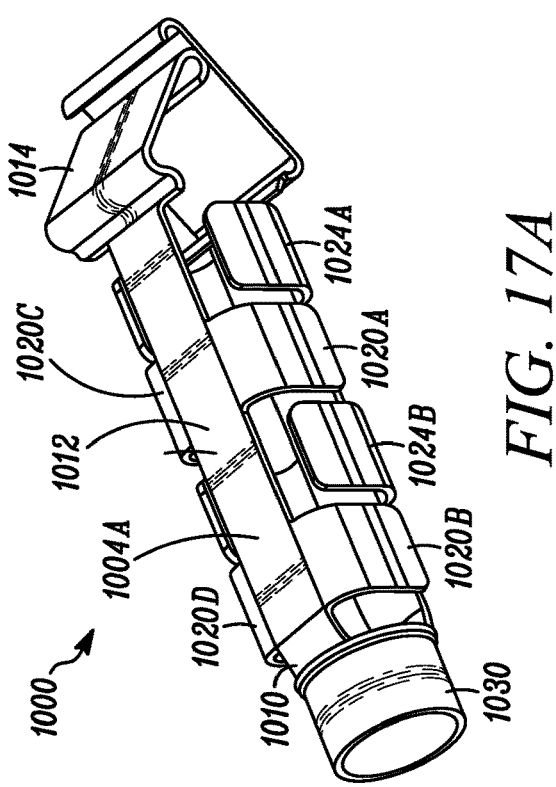
FIG. 17A is a perspective view depicting a ninth embodiment of a safety clip, in accordance with an embodiment of the disclosure.

Referring to FIGS. 17A-C, and ninth embodiment of a safety clip 1000 is depicted in accordance with the disclosure. FIG. 17A depicts the safety clip 1000 alone, separate from the needle cannula 106. FIGS. 17B-C depict the safety clip 1000 and the second or safe position, in which the sharp distal tip 110 of the needle cannula 106 is captured within the safety clip 1000.

In one embodiment, safety clip 1000 can share structural similarities to previously discussed safety clips. For example, safety clip 1000 can include one or more guard arms 1004A/B having a proximal portion 1010, linear portion 1012, and distal wall 1014. In one embodiment, the linear portion 1012 of a first guard arm 1004A can include one or more tabs 1020A-D positioned on either lateral side of the linear portion 1012, such that the tabs 1020A-D are configured to at least partially conform to an outer diameter of the needle cannula 106. In one embodiment, the safety clip 1000 can include four tabs 1020A-D, wherein certain tabs (e.g., 1020A & 1020C, and 1020B & 1020D) are spaced to oppose each other on opposite lateral sides of the linear portion 1012. Corresponding tabs 1024A-D on a second guard arm 1004B can be positioned on either lateral side of a corresponding linear portion, such that the tabs 1024A-D are configured to mesh with the tabs 1020A-D of the first guard arm 1004, when the safety clip 1000 is in the second or safe position.

In one embodiment, the safety clip 1000 can include a tubular cuff 1030 in place of a proximal wall defining an aperture. In one embodiment, the cuff 1030 can be configured to be positioned around or over the needle cannula 106. In some embodiments, the cuff 1030 can have an inner diameter configured to engage the needle transition 114 to inhibit distal advancement of the safety clip 1000 off the sharp distal tip 110 of the needle cannula 106.

Referring to FIGS. 18A-C, and tenth embodiment of a safety clip 1100 is depicted in accordance with the disclosure. FIG. 18A depicts the safety clip 1100 alone, separate from the needle cannula 106. FIGS. 18B-C depict the safety clip 1100 and the second or safe position, in which the sharp distal tip 110 of the needle cannula 106 is captured within the safety clip 1100.

In one embodiment, safety clip 1100 can share structural similarities to previously discussed safety clips. For example, safety clip 1100 can include one or more guard arms 1104A/B having a proximal portion 1110, linear portion 1112, and distal wall 1114. In one embodiment, the one or more tabs 1120A-D can be positioned on either lateral side of the linear portion 1112, in an alternating configuration, such that each tab 1120A-D of the linear portion 1112 opposes another tab 1120A-D of the same linear portion 1112. Corresponding tabs 1124A-D on a second guard arm 1104B can be positioned on either lateral side of a corresponding linear portion, such that the tabs 1124A-D are configured to mesh with the tabs 1120A-D of the first guard arm 1104, when the safety clip 1100 is in the second or safe position.

Figure 19A:
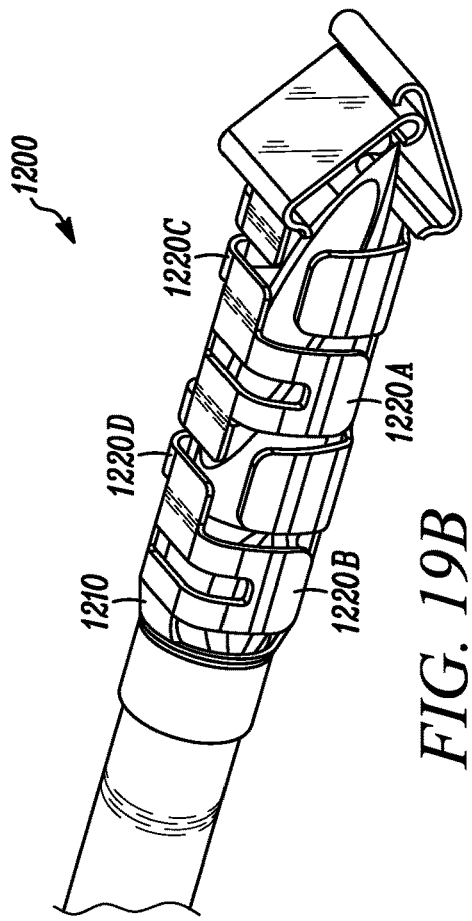
FIG. 19A is a perspective view depicting an eleventh embodiment of a safety clip, in accordance with an embodiment of the disclosure.
Figure 19B:
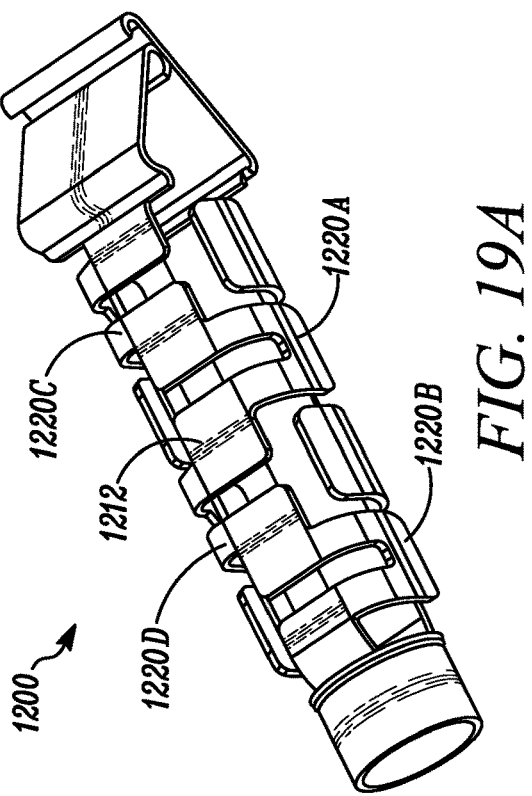
FIG. 19B is a perspective view depicting the safety clip of FIG. 19A with a needle cannula, wherein the safety clip is in a second or safe position, in accordance with an embodiment of the disclosure.
Figure 19C:
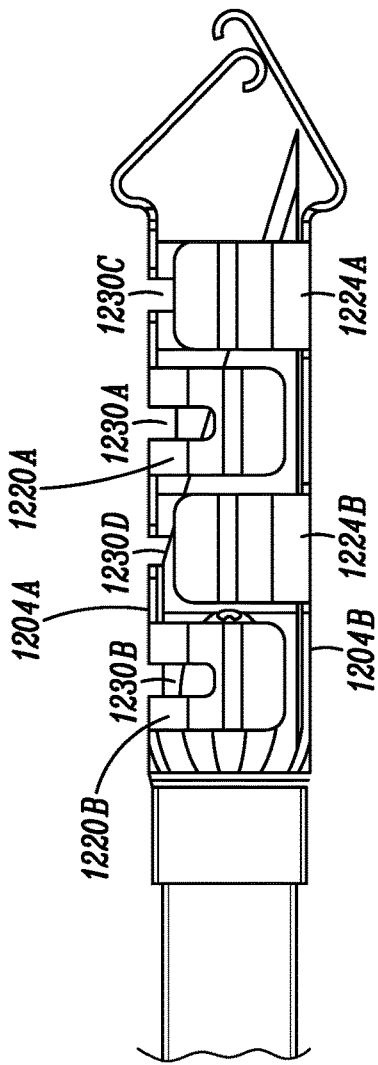
FIG. 19C is a profile view depicting the safety clip and needle cannula of FIG. 19B in the second or safe position, in accordance with an embodiment of the disclosure.

Referring to FIGS. 19A-C, and eleventh embodiment of a safety clip 1200 is depicted in accordance with the disclosure. FIG. 19A depicts the safety clip 1200 alone, separate from the needle cannula 106. FIGS. 19B-C depict the safety clip 1200 and the second or safe position, in which the sharp distal tip 110 of the needle cannula 106 is captured within the safety clip 1200.

In one embodiment, safety clip 1200 can share structural similarities to previously discussed safety clips. For example, safety clip 1200 can include one or more guard arms 1204A/B having a proximal portion 1210, linear portion 1212, and distal wall 1214. In one embodiment, the one or more tabs 1220A-D can be positioned on either lateral side of the linear portion 1212, in an alternating configuration, such that each tab 1220A-D of the linear portion 1212 opposes another tab 1220A-D of the same linear portion 1212. Corresponding tabs 1224A-D on a second guard arm 1204B can be positioned on either lateral side of a corresponding linear portion, such that the tabs 1224A-D are configured to mesh with the tabs 1220A-D of the first guard arm 1204, when the safety clip 1200 is in the second or safe position. In one embodiment, the linear portion 1212 and portions of the tabs 1220A-D can define material cutouts 1230A-B configured to aid in the compliance or resiliency of the safety clip 1200.

Figure 20B:
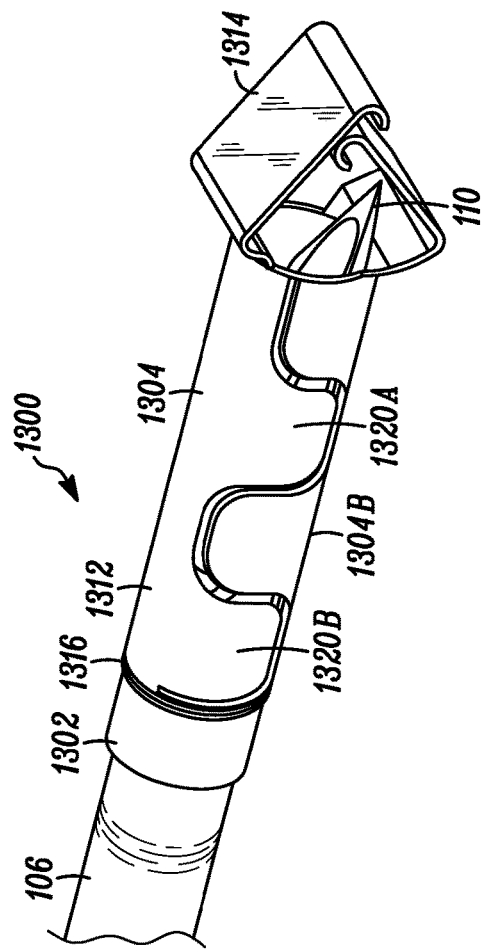
FIG. 20B is a perspective view depicting the safety clip of FIG. 20A with a needle cannula, wherein the safety clip is in a second or safe position, in accordance with an embodiment of the disclosure.
Figure 20A:
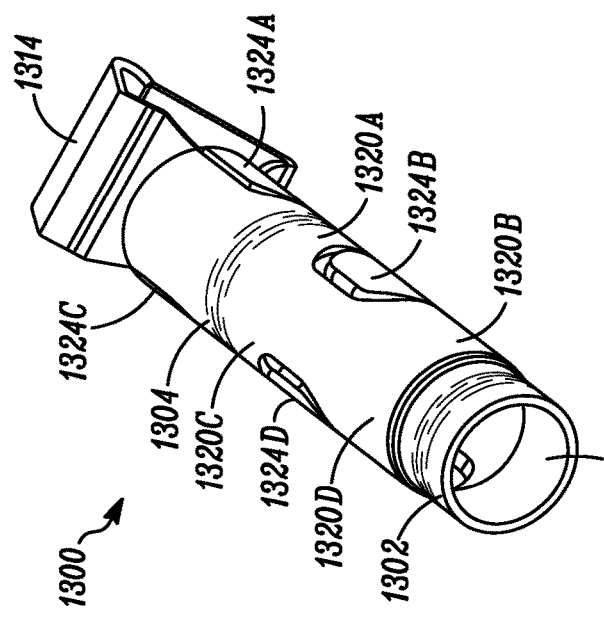
FIG. 20A is a perspective view depicting a twelfth embodiment of a safety clip, in accordance with an embodiment of the disclosure.
Figure 20C:
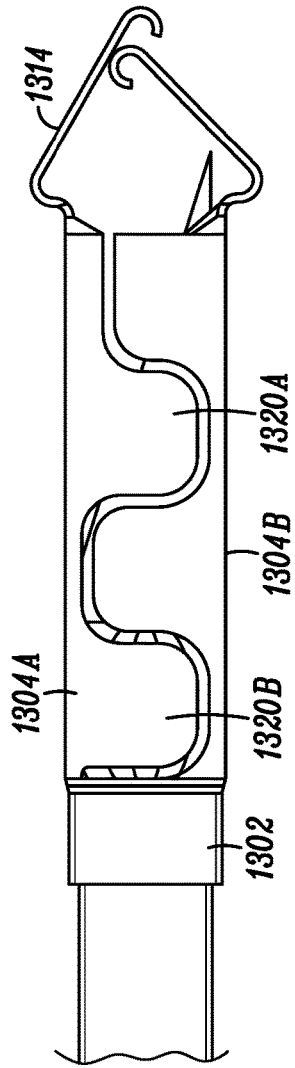
FIG. 20C is a profile view depicting the safety clip and needle cannula of FIG. 20B in the second or safe position, in accordance with an embodiment of the disclosure.

Referring to FIGS. 20A-C, an twelfth embodiment of a safety clip 1300 is depicted in accordance with the disclosure. FIG. 20A depicts the safety clip 1300 alone, separate from the needle cannula 106. FIGS. 20B-C depict the safety clip 1300 in the second or safe position, in which the sharp distal tip 110 of the needle cannula 106 is captured within the safety clip 1300.

In one embodiment, the safety clip 1300 can include a proximal cuff 1302 and one or more guard arms 1304. The proximal cuff 1302 can define a lumen or internal diameter 1306 configured to be positioned around or over the needle cannula 106. In some embodiments, the proximal cuff 1302 and internal diameter 1306 can be configured to engage the needle transition 114 to inhibit distal advancements of the safety clip 1300 off the sharp distal tip 110 of the needle cannula 106.

The one or more guard arms 1304 can extend distally from the proximal cuff 1302. In one embodiment, the safety clip 1300 can include a pair of guard arms 1304A/B. The safety clip 1300 can be formed (e.g., stamped or laser cut) from a generally resilient material, for example medical grade stainless steel, such that the guard arms 1304 have a natural bias towards a free or relaxed state when portions of the safety clip 1300 are deflected away from the free state. Accordingly, when the safety clip 1300 is in the first or ready for use position the guard arms 1304A/B can be biased against the needle cannula 106, as the presence of the needle cannula 106 forces the guard arms 1304A/B to be deflected away from their free state. When the needle cannula 106 is retracted, and the sharp distal tip 110 moves proximally between the guard arms 1304, the guard arms 1304 naturally biased towards their free state, thereby capturing the sharp distal tip 110 therebetween. In some embodiments, further proximal movement of the sharp distal tip 110 is inhibited by a crossed mention of the needle transition 114 being larger than the internal diameter 1306 of the proximal cuff 1302. In some embodiments, distal movement of the sharp distal tip 110 is inhibited by a distal portion of at least one of the arms 1304A/B.

In one embodiment, the first guard arm 1304A and the second guard arm 1304B can together generally form a cylindrical shape configured to at least partially surrounds the needle cannula 106, when the safety clip 1300 is in the second or safe position. For example, each of the first guard arm 1304A and the second guard arm 1304B can include a linear portion 1312 having a semicircular or otherwise a generally arc-shaped cross section. The linear portion 1312 can be adjacent to the proximal cuff 1302, such that the linear portion 1312 and the proximal cuff 1302 are separated by a joint or pivotable coupling 1316, which in some embodiments can be a living hinge. A distal wall 1314 similar to previously disclosed embodiments can be adjacent to the linear portion 1312.

In one embodiment, the linear portion 1312 can include one or more tabs 1320A-D positioned on either lateral side of the linear portion 1312, such that the tabs 1320A-D are configured to conform to the semicircular or otherwise a generally arc-shaped cross section of the guard arm 1304, so as to at least partially conform to an outer diameter of the needle cannula 1306. Accordingly, the one or more tabs 1320A-D of the linear portion 1312 can be configured to maintain the position of the safety clip 1300 along the needle cannula 106, particularly as the needle cannula 106 is retracted and moved with respect to the safety clip 1300.

In one embodiment, the second guard arm 1304B can also include a linear portion 1312B, and a distal wall having a similar configuration to that of the first guard arm 1312A. In one embodiment, the second guard arm 1304B can include a corresponding one or more tabs 1324A-D positioned on either lateral side of the linear portion, such that the tabs 1324A-D are configured to at least partially conform to an outer diameter of the needle cannula 106. In one embodiment, the one or more tabs 1324A-D can be configured to mesh with the one or more tabs 1320A-D of the first guard arm 1304A, when the safety clip 1300 is in the second or safe position. Accordingly, in some embodiments, the guard arms 1304A-B are non-intersecting (i.e., the guard arms 1304A-B do not cross or intersect one another along a longitudinal axis of the needle cannula 106).

Figure 21A:
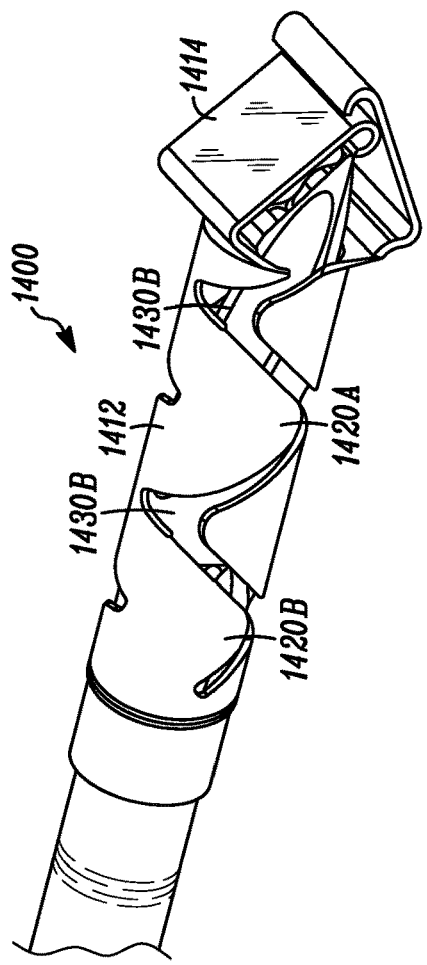
FIG. 21A is a perspective view depicting a thirteenth embodiment of a safety clip, in accordance with an embodiment of the disclosure.
Figure 21B:
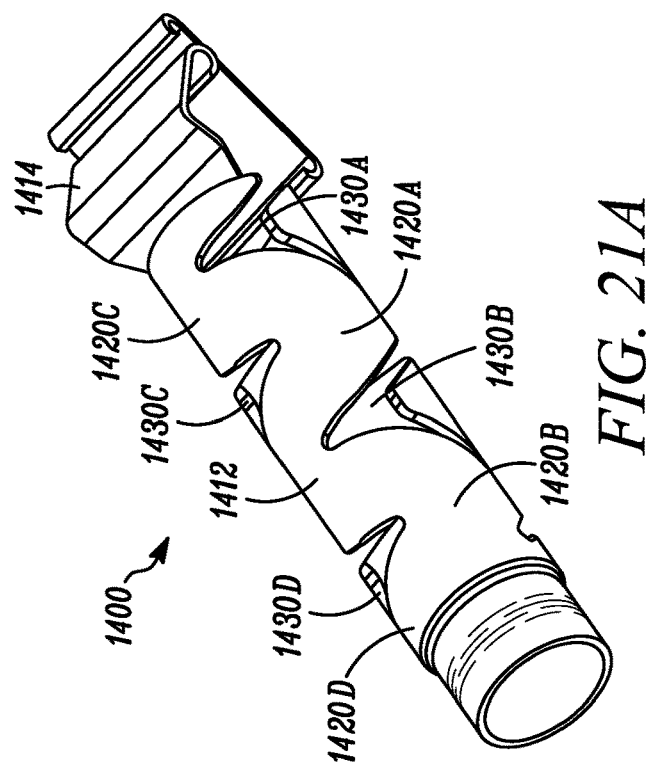
FIG. 21B is a perspective view depicting the safety clip of FIG. 21A with a needle cannula, wherein the safety clip is in a second or safe position, in accordance with an embodiment of the disclosure.
Figure 21C:
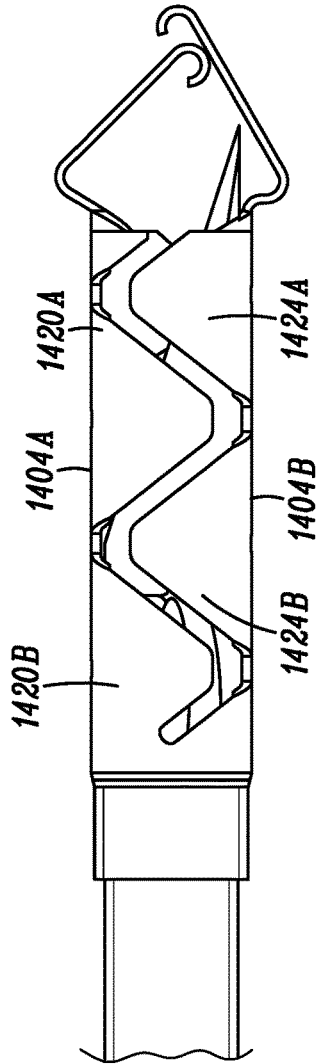
FIG. 21C is a profile view depicting the safety clip and needle cannula of FIG. 21B in the second or safe position, in accordance with an embodiment of the disclosure.

Referring to FIGS. 21A-C, a thirteenth embodiment of a safety clip 1400 is depicted in accordance with the disclosure. FIG. 21A depicts the safety clip 1400 alone, separate from the needle cannula 106. FIGS. 21B-C depict the safety clip 1400 in the second or safe position, in which the sharp distal tip 110 of the needle cannula 106 is captured within the safety clip 1400.

In one embodiment, safety clip 1400 can share structural similarities to previously discussed safety clips (e.g., safety clip 1300). For example, safety clip 1400 can include one or more guard arms 1404A/B having a linear portion 1412, and distal wall 1414. In one embodiment, the one or more tabs 1420A-D can be positioned on either lateral side of the linear portion 1412. Corresponding tabs 1424A-D on a second guard arm 1404B can be positioned on either lateral side of a corresponding linear portion, such that the tabs 1424A-D are configured to mesh with the tabs 1420A-D of the first guard arm 1404, when the safety clip 1400 is in the second or safe position. In one embodiment, the linear portion 1412 and portions of the tabs 1420A-D can define material cutouts 1430A-B configured to aid in the compliance or resiliency of the safety clip 1400.

Figure 22A:
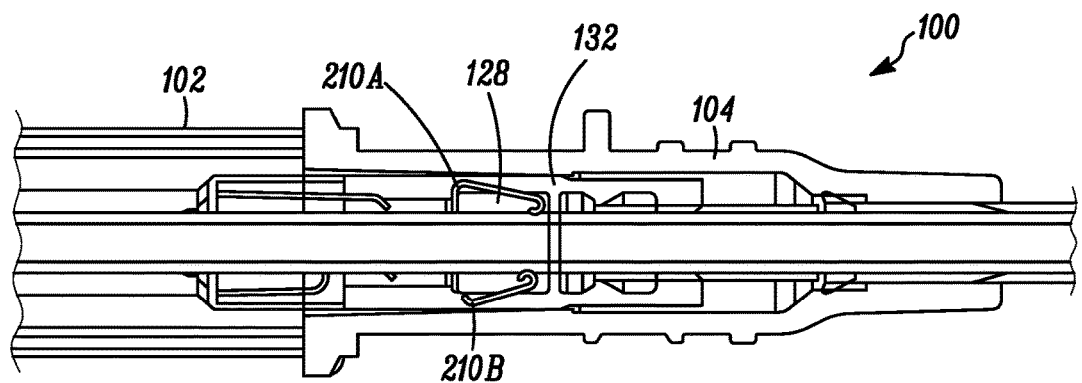
FIG. 22A is a partial cross sectional view depicting a safety catheter assembly in a first or ready for use position, in accordance with an embodiment of the disclosure.
Figure 22B:
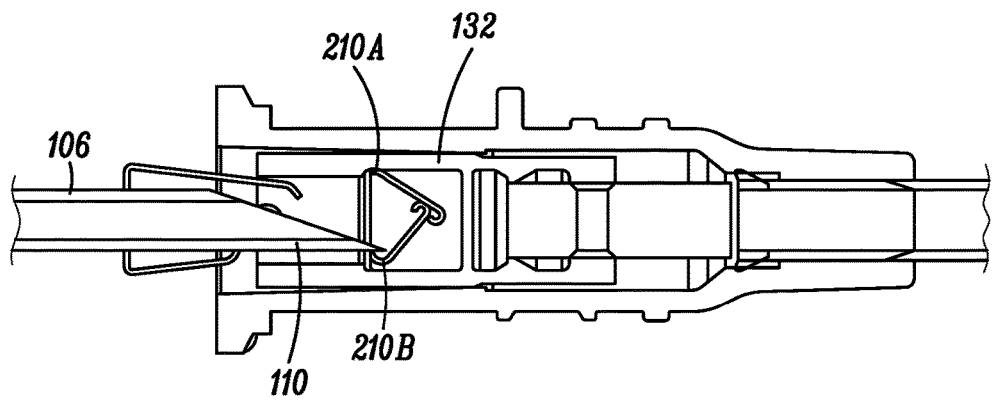
FIG. 22B is a partial cross sectional view of the safety catheter assembly of FIG. 22A, wherein the safety catheter assembly is in transition between the first or ready for use position and a second or safe position, in accordance with an embodiment of the disclosure.
Figure 22C:
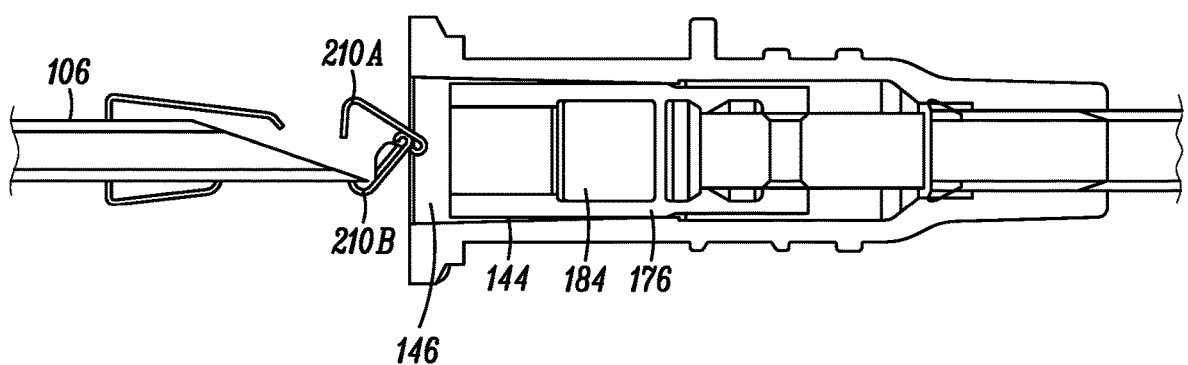
FIG. 22C is a partial cross-sectional view of the safety catheter assembly of FIG. 22B, wherein the safety catheter assembly is in the second door safe position, in accordance with an embodiment of the disclosure.

Referring to FIGS. 22A-C, partial cross sectional views of a safety catheter assembly 100 in the first or ready for use position, in a transitional position, and in the second or safe position are depicted in accordance with an embodiment of the disclosure. In one embodiment, at least the seal member 132 and the safety clip 128 cooperatively form a "passive release mechanism" The term passive release mechanism, as used herein, as understood to refer to features of a catheter insertion assembly 100 that inhibit the release of the catheter assembly 104 from the needle insertion device 102 until after the sharp distal tip 110 of the needle cannula 106 has been captured within the safety clip 128. Some or all of the features of the passive release mechanism can be integral with other components of the catheter insertion assembly 100. In this respect, the term passive release mechanism does not necessarily refer to a component that is separate from the catheter insertion device 102 and/or the catheter assembly 104. Rather, it is to be appreciated that various components of the catheter insertion device 102 and/or catheter assembly 104 can form the passive release mechanism.

In one embodiment, the passive release mechanism can be configured to couple the catheter hub 122 to the catheter insertion device 102 in the first or ready for use position, and release the catheter hub 122 from the catheter insertion device 102 in the second or safe position. Further, the passive release mechanism inhibits release of the catheter hub 122 from the catheter insertion 102 device until after the sharp distal tip 110 of the needle cannula 106 is in a safe position, where access to the sharp distal tip 110 is inhibited. Release of the catheter hub 122 from the catheter insertion device 102 can occur during a catheter insertion procedure without a need to perform additional steps aside from safely retracting the needle cannula 106. In this respect, the catheter can be "passively" released by a clinician to obtain passive safety. By way of example, the catheter can be released when a clinician pulls on a portion of the catheter insertion device 102 as the clinician withdraws the needle 106 from the catheter assembly 104.

As depicted in FIG. 22A, when the safety clip 128 is in the first or ready for use position, the guard arms 210A-B are forced apart from one another, which in turn causes a portion of the guard arms 210A-B to apply a compressive force to the wall 176 of the proximal portion 184 of the interior cavity 178 of the seal member 132, thereby inhibiting movement of the safety clip 128 relative to the seal member 132. In one embodiment, the seal member 132 being naturally resilient, in turn transfers at least a portion of this compressive force to the internal wall 144 of the proximal portion 148 of the interior cavity 146 of the catheter hub 122, thereby inhibiting movement of the safety clip 128 and/or seal member 132 relative to the catheter hub 122. Accordingly, the compressive force generates frictional, interfering contact between components of the passive release mechanism, which inhibits release of the catheter hub 122 from the catheter insertion device 102.

As depicted in FIGS. 22B-C, when the needle cannula 106 is retracted, and the sharp distal tip 106 is safely captured by the safety clip 128, the guard arms 210A-B move towards one another and the compressive force between the safety clip 128 and the seal member 132 ceases. Thereafter, the safety clip 128 can be removed from the seal member 132 without substantial interference. Accordingly, release of the catheter hub 122 from the catheter insertion device 102 occurs only after the sharp distal tip 110 of the needle cannula 106 is in a safe position.

In one embodiment, the safety clip 128 can at least partially reside or be housed or contained within the proximal portion 184 of the interior cavity 178 of the seal member 132, and at least partially reside or be housed or contained within the proximal portion 148 of the interior cavity 146 of the catheter hub 122. In one embodiment, the catheter insertion assembly 100 can further include a proximal cup 1502, in which a proximal portion of the safety clip 128 at least partially resides or is housed or contained within a proximal cup 1502.

Figure 23A:
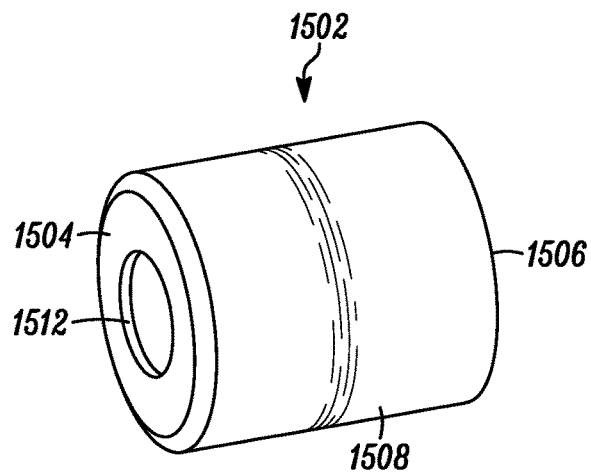
FIG. 23A is a perspective view depicting a proximal cup, in accordance with an embodiment of the disclosure.
Figure 23B:
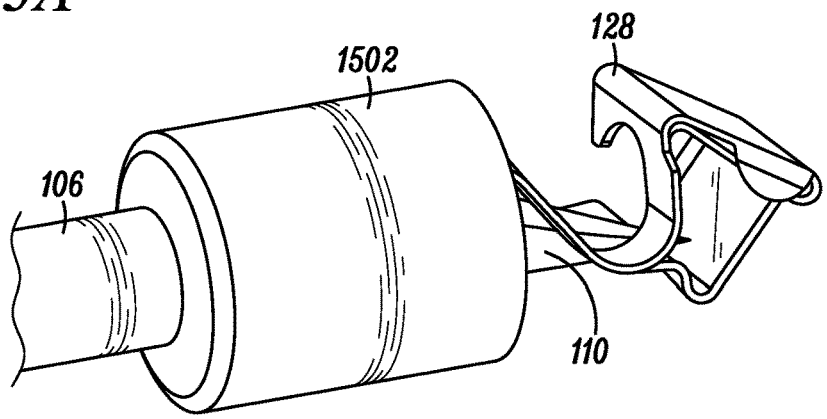
FIG. 23B is a partial perspective view depicting a needle cannula, safety clip, and proximal cup in a second or safe position, in accordance with an embodiment of the disclosure.

Referring to FIG. 23A, a proximal cup 1502 is depicted in accordance with an embodiment of the disclosure. In one embodiment, the proximal cup 1502 can include a proximal end 1504, an open distal end 1506, and a generally cylindrical wall 1508 defining an internal cavity therebetween. In one embodiment, the proximal end 1504 of the proximal cup 1502 can define an aperture 1512 shaped and sized to closely conform to the outer diameter of the needle cannula 106, so as to inhibit the leakage of blood or bodily fluid during advancement of the catheter assembly 104 by restricting the flow of air and/or bodily fluid out of the interior cavity 146 of the catheter hub 122 and/or contain blood or bodily fluid from the patient. In some embodiments, the proximal cup 1502 can inhibit tampering with the safety clip 128 prior to the safety clip 128 transitioning to the second or safe position (as depicted in FIG. 23B). In some embodiments, the proximal cup 1502 serves to further stabilize the safety clip 128, as the proximal cup 1502 can be fixedly or operably coupled to the safety clip 128 before and after transitioning to the second or safe position. In one embodiment, the proximal cup 1502 can be fabricated of metal. In one embodiment, the safety clip 128 and the proximal cup 1502 can be formed as a unitary component.

Figure 23C:
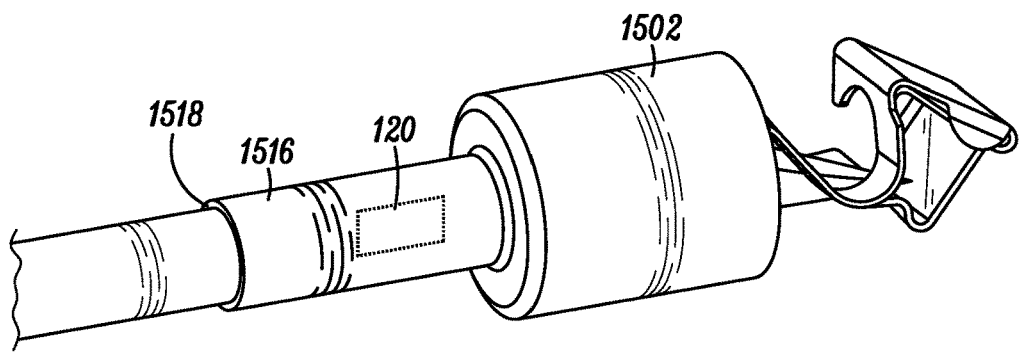
FIG. 23C is a partial perspective view depicting a needle cannula, safety clip, and proximal cup having a stem extension in a second or safe position, in accordance with an embodiment of the disclosure.

Referring to FIG. 23C, to further inhibit the leakage of blood or bodily fluid during advancement of the catheter assembly 104, in some embodiments, the proximal cup 1502 can further include a stem extension 1514. The stem extension 1514 can include a generally cylindrical wall 1516 defining an aperture 1518 shaped and sized to closely conform to the outer diameter of the needle cannula 106 so as to inhibit the leakage of blood or bodily fluid. In one embodiment, the stem extension 1514 can be fabricated of metal. In other embodiments, the stem extension 1514 can be formed of a flexible or resilient material to further aid in the conformance to the outer diameter of the needle cannula 106. In embodiments where the needle cannula 106 includes a notch 120 to indicate flashback between the outer diameter of the needle cannula 106 and the internal diameter of the catheter tube 124, the stem extension 1514 can be appropriately sized to extend over the notch 120, so as to inhibit the flow of blood or bodily fluid through the notch 120.

Figure 23D:
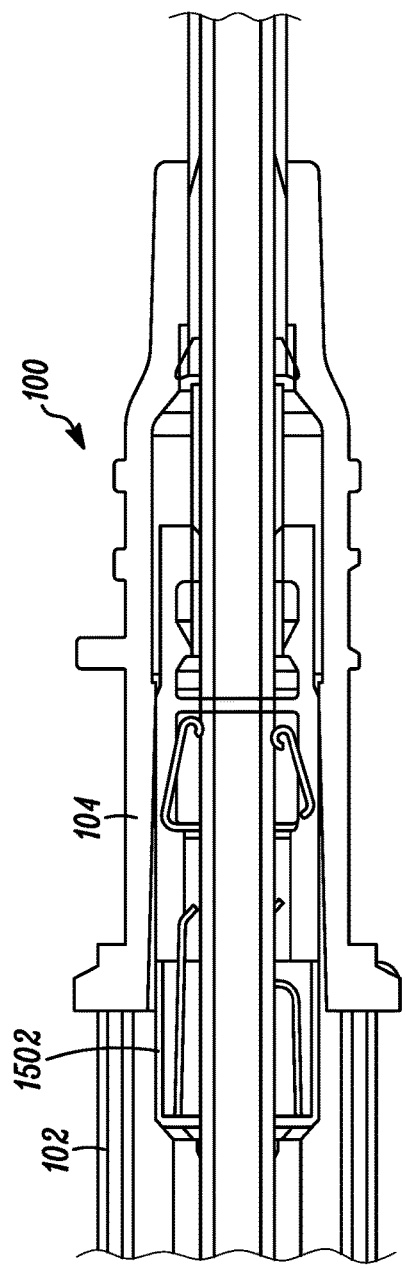
FIG. 23D is a partial cross-sectional view depicting a safety catheter insertion assembly having a proximal cup, wherein the safety catheter assembly is in a first or ready for use position, in accordance with an embodiment of the disclosure.
Figure 23E:
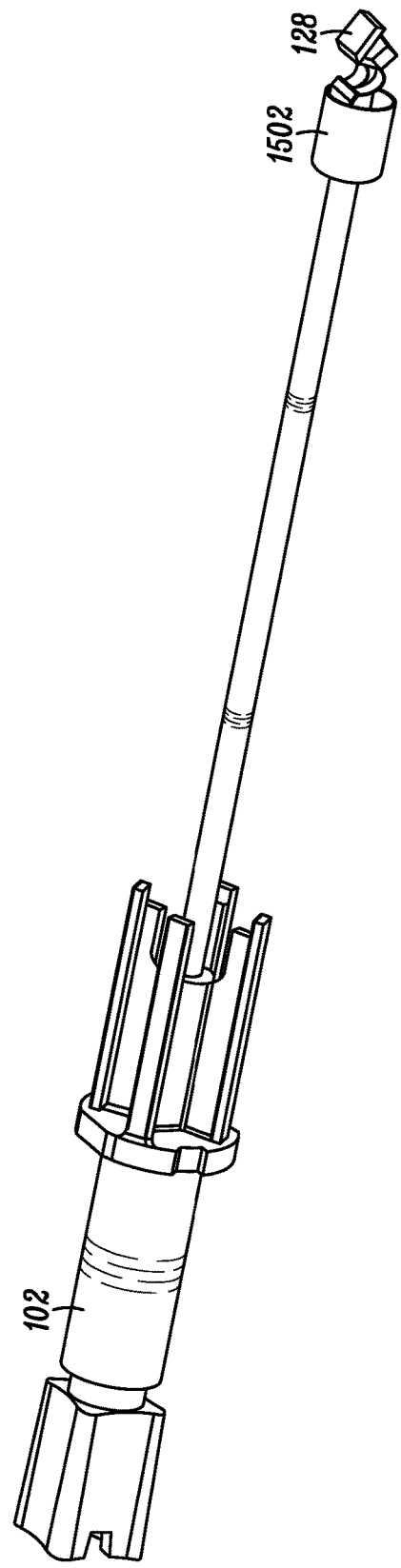
FIG. 23E is a perspective view depicting the safety catheter insertion assembly of FIG. 23D, wherein the safety catheter assembly is in a second or safe position, in accordance with an embodiment of the disclosure.

As depicted in FIG. 23D, a partial cross sectional view of a safety catheter assembly 100 including a proximal cup 1502, in which the safety catheter assembly is in the first or ready for use position, is depicted in accordance with an embodiment of the disclosure. In this embodiment, a proximal portion of the safety clip 128 at least partially resides or is housed or contained within the proximal cup 1502. As depicted in FIG. 23E, a perspective view of the catheter insertion device 102, proximal cup 1502 and safety clip 128 in the second or safe position as depicted in accordance with an embodiment of the disclosure. In this embodiment, the proximal portion of the safety clip 128 remains within the proximal cup 1502.

It should be understood that the individual steps used in the methods of the present teachings may be performed in any order and/or simultaneously, as long as the teaching remains operable. Furthermore, it should be understood that the apparatus and methods of the present teachings can include any number, or all, of the described embodiments, as long as the teaching remains operable.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. An IV therapy device, comprising:
    a catheter hub comprising an inner wall defining a catheter hub cavity;
    a blood control valve positioned within the catheter hub cavity having a wall defining a blood control valve cavity;
    a safety clip positioned at least partially within the blood control valve cavity, the safety clip selectively fixed in position relative to the blood control valve by frictional interfering contact with the wall of the blood control valve; and
    a needle comprising an elongate body and a sharp distal tip, the needle moveable relative to the catheter hub between a ready position and a safe position,
    wherein in the ready position, the elongate body of the needle passes through at least a portion of the safety clip and the blood control valve, and
    wherein in the safe position, the sharp distal tip of the needle is captured in the safety dip and the safety dip is no longer in frictional interfering contact with the wall of the blood control valve.

2. The IV therapy device of claim 1, further comprising an actuator extending proximately in the catheter hub cavity, the actuator having a free end adapted to open a membrane provided in the blood control valve when the blood control valve is moved to bias the membrane against the free end.

3. The IV therapy device of claim 2, wherein the blood control valve further comprises an actuator cavity configured to house the actuator, and a resealable membrane positioned proximal to the actuator cavity, wherein the blood control valve is shiftable relative to the free end of the actuator between a first position in which the membrane is closed, and a second position in which the membrane is open.

4. The IV therapy device of claim 3, wherein the membrane includes a slit shaped and sized to closely conform to an outer diameter of the elongate body of the needle.

5. The IV therapy device of claim 1, further comprising a proximal cup mounted along the needle away from a needle hub to which a proximal end of the needle is coupled, the proximal cup having an open distal end, a proximal end and a proximal cup cavity defined between the open distal end and the proximal end, wherein the proximal cup cavity is adapted to adjoin with the blood control valve cavity to form a safety clip cavity to house the safety clip.

6. The IV therapy device of claim 5, wherein the proximal cup further includes a stem extension having an aperture configured to conform to an outer diameter of the elongate body of the needle to inhibit fluid leakage from the proximal cup cavity during operation of the therapy device.

7. The IV therapy device of claim 1, wherein the blood control valve includes a membrane configured to enable the elongate body of the needle to selectively pass therethrough, and a wiper assembly positioned distal to the membrane configured to inhibit passage of bodily fluid.

8. The IV therapy device of claim 1, wherein the safety clip includes a first arm and a second arm biased towards a longitudinal axis of the needle in the ready position and wherein the first arm includes a pair of needle guide surfaces that extend beyond the longitudinal axis of the needle when the safety clip captures the sharp distal tip of the needle.

9. The IV therapy device of claim 8, wherein the first arm includes a first needle guide surface and the second arm includes a second guide surface, wherein when the safety dip is in a collapsed configuration the first and second needle guide surfaces extend beyond a longitudinal axis of the needle.

10. The IV therapy device of claim 1, wherein the blood control valve includes a membrane that divides the blood control valve cavity into a distal portion and a proximal portion that has an opened end, wherein the safety dip has a distal portion slidably positioned through the opened end into the proximal portion, the distal portion of the safety clip adapted to apply a compressive force against at least the wall of the blood control valve to inhibit relative movement of the safety clip and the blood control valve when the needle extends through the safety clip and adapted to collapse so as to remove the compressive force against the wall of the blood control valve to enable the distal portion of the safety clip to be removed from the proximal portion when the distal tip of the needle is captured in the distal portion.

11. An IV therapy device, comprising:
    a catheter hub assembly comprising a catheter hub having a catheter hub cavity and a blood control valve positioned within the catheter hub cavity, the blood control valve having a wall defining a blood control valve cavity; and
    a safety clip configured to axially slide along a needle having an elongate body and a sharp distal tip positioned at least partially within the blood control valve cavity, the safety clip selectively fixed in position relative to the blood control valve by frictional interfering contact with the wall of the blood control valve,
    wherein the needle is moveable relative to the catheter hub assembly between a ready position and a safe position, wherein in the ready position the elongate body of the needle passes through at least a portion of the safety dip and the blood control valve and the safety clip and the blood control valve are in frictional interfering contact with each other, and wherein in the safe position, the sharp distal tip of the needle is captured in the safety dip and the safety clip and the blood control valve are not in contact with each other.

12. The IV therapy device of claim 11, wherein the safety clip includes a first arm and a second arm biased towards a longitudinal axis of the needle in the ready position, the first arm includes a pair of needle guide surfaces that extend beyond the longitudinal axis of the needle when the safety clip captures the sharp distal tip of the needle.

13. The IV therapy device of claim 12, wherein the first arm includes a first needle guide surface and the second arm includes a second guide surface, wherein when the safety clip is in a collapsed configuration the first and second needle guide surfaces extend beyond a longitudinal axis of the needle.

14. The IV therapy device of claim 11, wherein the blood control valve includes a membrane that divides the blood control valve cavity into a distal portion and a proximal portion that has an opened end, wherein the safety clip has a distal portion slidably positioned through the opened end into the proximal portion, the distal portion of the safety clip adapted to apply a compressive force against at least the wall of the blood control valve to inhibit relative movement of the safety clip and the blood control valve when the needle extends through the safety clip and adapted to collapse so as to remove the compressive force against the wall of the blood control valve to enable the distal portion of the safety cli to be removed from the proximal portion when the distal tip of the needle is captured in the distal portion.

15. The IV therapy device of claim 11, wherein the catheter hub assembly further comprises an actuator extending proximately in the catheter hub cavity, the actuator having a free end adapted to open a membrane provided in the blood control valve when the blood control valve is moved to bias the membrane against the free end.

16. A safety catheter assembly, comprising:
a catheter hub assembly including a catheter hub having a catheter hub cavity, a catheter extending from a distal end of the catheter hub and a blood control valve having a blood control valve cavity positioned within the catheter hub cavity; and
a catheter insertion device including a safety clip at least partially positioned within the blood control valve cavity and a needle having a sharp distal tip, wherein the catheter insertion device is moveable relative to the catheter hub assembly between a ready position and a safe position, wherein in the ready position, a portion of the needle is positioned within the catheter with the sharp distal tip of the needle extending from a distal end of the catheter and at least a portion of the safety dip is positioned in the blood control valve cavity in an expanded configuration, and wherein in the safe position, the safety dip is in a collapsed configuration partially surrounding the sharp distal tip of the needle.

17. The safety catheter assembly of claim 16, wherein the safety clip includes a first arm and a second arm biased towards a longitudinal axis of the needle in the ready position, and wherein the first arm includes a pair of needle guide surfaces that extend distal of the sharp distal tip of the needle.

18. The safety catheter assembly of claim 17, wherein the first arm includes a first needle guide surface and the second arm includes a second guide surface, wherein when the safety dip is in a collapsed configuration the first and second needle guide surfaces are distal of the sharp distal tip of the needle.

19. The safety catheter assembly of claim 16, wherein the blood control valve includes a membrane that divides the blood control valve cavity into a distal portion and a proximal portion that has an opened end, wherein the safety dip has a distal portion slidably positioned through the opened end into the proximal portion, the distal portion of the safety clip adapted to apply a compressive force against at least the wall of the blood control valve to inhibit relative movement of the safety clip and the blood control valve when the needle extends through the safety clip and adapted to collapse so as to remove the compressive force against the wall of the blood control valve to enable the distal portion of the safety clip to be removed from the proximal portion when the distal tip of the needle is captured in the distal portion.

20. The safety catheter assembly of claim 16, wherein the catheter hub assembly further comprises an actuator extending proximately in the catheter hub cavity, the actuator having a free end adapted to open a membrane provided in the blood control valve when the blood control valve is moved to bias the membrane against the free end.

* * * * *